United States Patent [19]

Imai

[11] Patent Number: 5,512,977
[45] Date of Patent: Apr. 30, 1996

[54] COPYING MACHINE WITH ENCRYPTION FUNCTION

[75] Inventor: Hideki Imai, Yokohama, Japan

[73] Assignee: Pumpkin House Incorporated, Kanagawa, Japan

[21] Appl. No.: 424,279

[22] PCT Filed: Oct. 20, 1993

[86] PCT No.: PCT/JP93/01513

§ 371 Date: Apr. 21, 1995

§ 102(e) Date: Apr. 21, 1995

[87] PCT Pub. No.: WO94/09591

PCT Pub. Date: Apr. 28, 1994

[30] Foreign Application Priority Data

| Oct. 21, 1992 | [JP] | Japan | 4-323542 |
| Oct. 26, 1992 | [JP] | Japan | 4-327142 |
| Oct. 26, 1992 | [JP] | Japan | 4-327143 |
| Oct. 26, 1992 | [JP] | Japan | 4-327144 |
| Oct. 28, 1992 | [JP] | Japan | 4-329813 |
| Nov. 2, 1992  | [JP] | Japan | 4-333411 |

[51] Int. Cl.[6] .................................................. G03G 21/00
[52] U.S. Cl. .................................................. 355/201; 380/51
[58] Field of Search .............................. 355/201; 380/55, 380/59, 21, 51

[56] References Cited

FOREIGN PATENT DOCUMENTS

| 506405A2 | 9/1992 | European Pat. Off. . | |
| 54-25814 | 2/1979 | Japan | 355/201 |
| 1-147750 | 6/1989 | Japan . | |
| 1-246962 | 10/1989 | Japan . | |
| 2-94836  | 4/1990 | Japan . | |
| 2-268077 | 11/1990 | Japan . | |
| 4-296169 | 10/1992 | Japan . | |

OTHER PUBLICATIONS

"Image Encryption Using Pseudo Random Number Generator" by Leon C. Williams, Xerox Disclosure Journal, vol. 17, No. 1 Jan./Feb. 1992.

Primary Examiner—R. L. Moses
Attorney, Agent, or Firm—Lowe, Price, LeBlanc & Becker

[57] ABSTRACT

Information is read from a medium such as paper in which information is written. The read information is enciphered. When encryption processing is performed, an encryption key is used. As the encryption key, an encryption key generated for each encryption is used, or an encryption key already generated is used again. The enciphered information is written into another medium such as paper. When decryption processing is performed, information is read from the medium in which the enciphered information is written. The read information is deciphered using as a decryption key the same key as the encryption key used when the encryption processing is performed. The deciphered information is written into another medium such as paper.

29 Claims, 18 Drawing Sheets

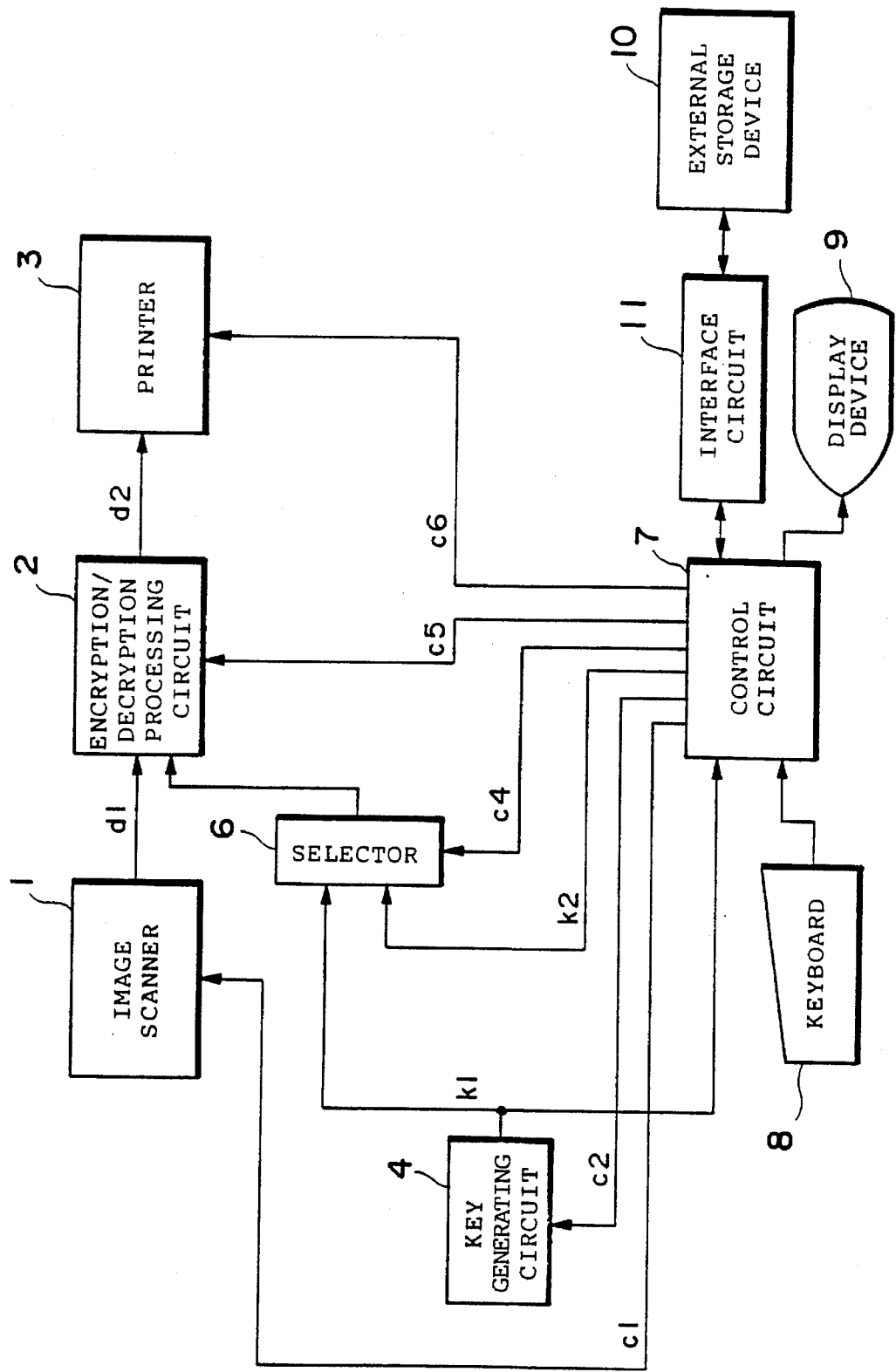

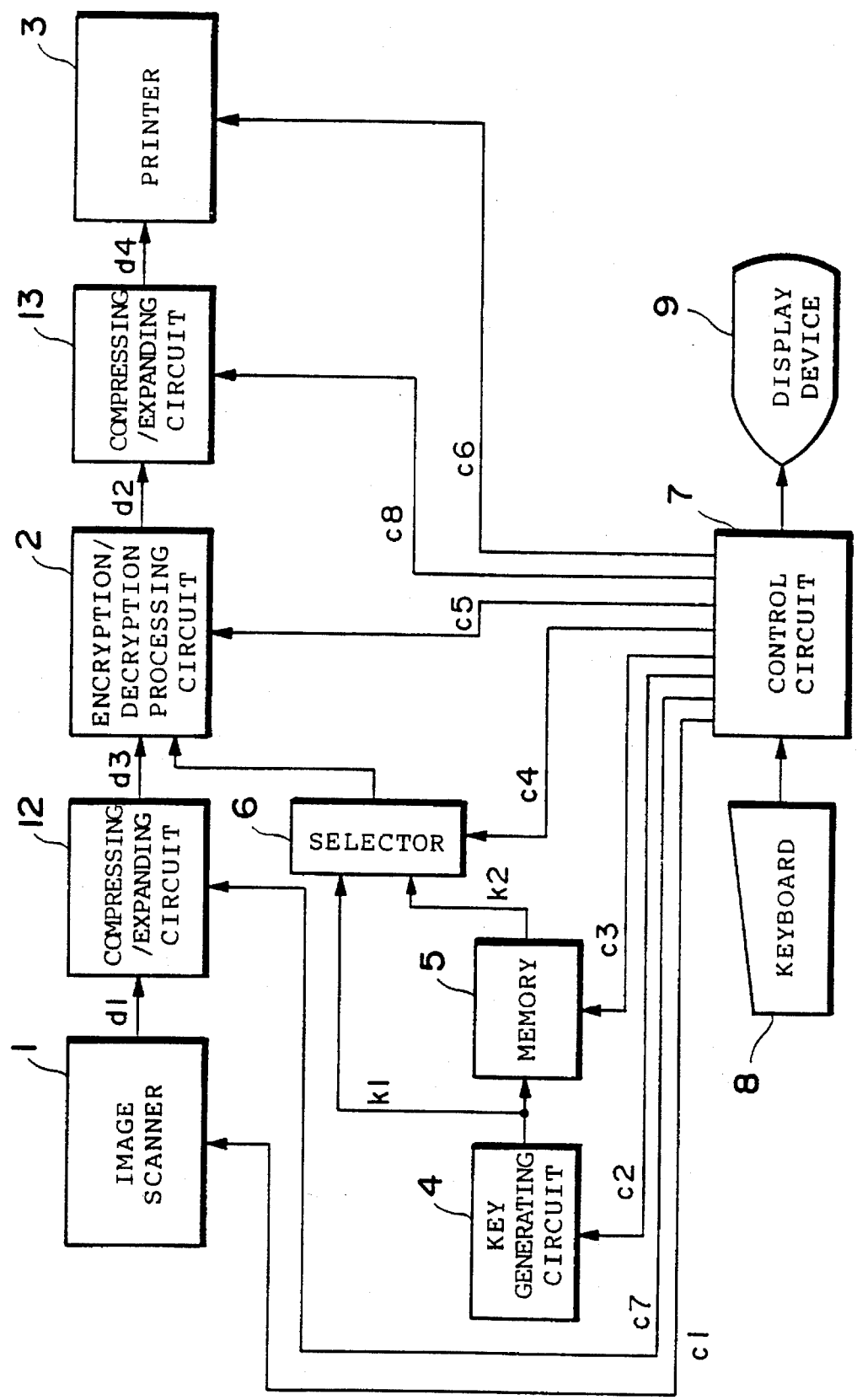

$j_1$ = FF FF FF FF (HEX)
$j_2$ = E5 E5 E5 E5 (HEX)

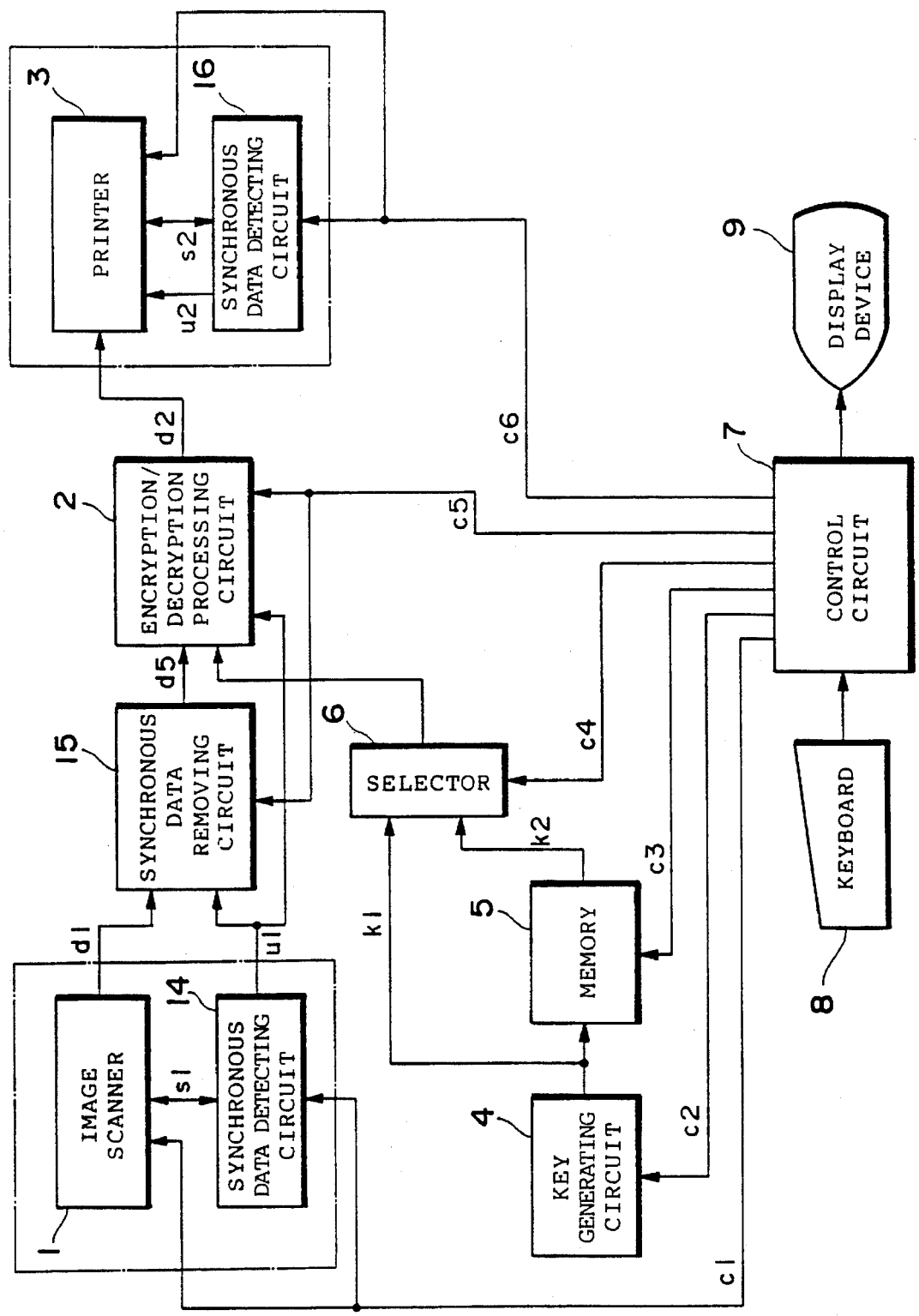

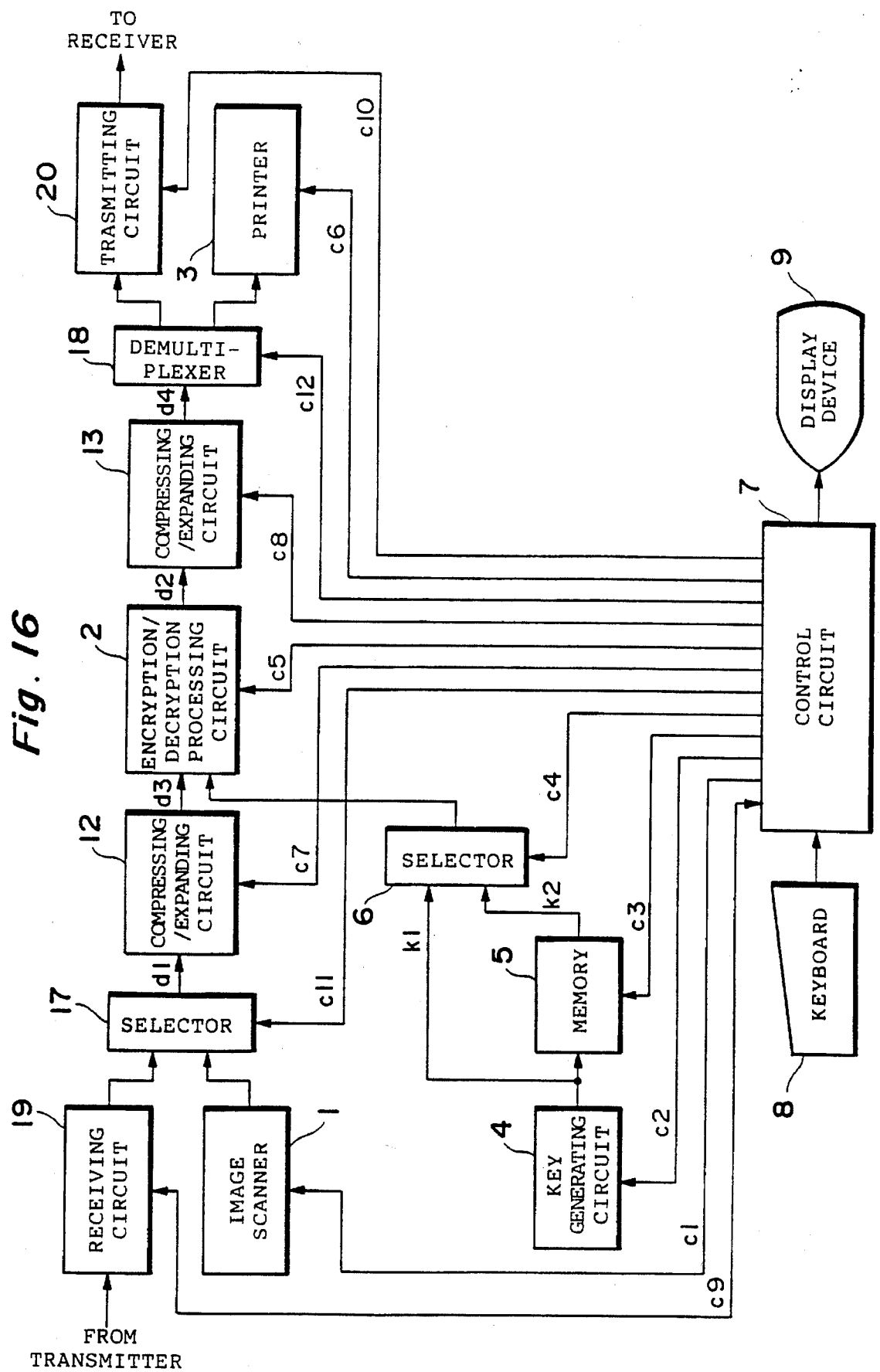

COPYING MACHINE WITH ENCRYPTION FUNCTION

TECHNICAL FIELD

The present invention relates to a copying machine (a copier) with an encryption function for optically reading information printed, or described or written on a medium such as paper, enciphering (encrypting) or deciphering (decrypting) the read information, and printing or describing or writing the enciphered or deciphered information on the medium such as paper again or storing the enciphered or deciphered information in a medium in which information is to be electrically, magnetically or optically stored. Furthermore, the present invention relates to a copying machine with an encryption function for reading information from a medium on which information is to be electrically, magnetically or optically recorded, enciphering or deciphering the read information, and printing or describing or writing the read information on a medium such as paper.

BACKGROUND

When information printed on a medium such as paper is keep secret, the paper or the like is generally contained in a particular storage location, a book storeroom with a key, or the like. However, it is inconvenient to accommodate secret documents frequently created every day in a particular storage location, a book storeroom with a key, or the like one by one.

A method of enciphering information and printing the enciphered information on paper or the like is disclosed in Japanese Patent Application Laid-Open (Kokai) No. 1-147750. This makes it possible to store printed paper without accommodating the paper in a particular storage location or the like. However, the cryptography described in this publication is to only convert document data (plaintext data) into ciphertext data in accordance with a predetermined encryption table. Accordingly, the rule of encryption may be easily analyzed by a third person so that the ciphertext data is easily deciphered. Consequently, it is difficult to maintain secrecy about information even by the method described in this publication.

DISCLOSURE OF THE INVENTION

An object of the present invention is to provide a copying machine capable of generating an encryption key every time information described on a medium such as paper is copied, and enciphering the information using the generated encryption key and writing the enciphered information in another medium, thereby to make it difficult to analyze the enciphered information and make it possible to keep the information secret without storing the paper or the like in a particular storage location, a book storeroom or the like.

Another object of the present invention is to make it impossible for a third person to easily know an encryption key used when information is enciphered.

Still another object of the present invention is to automatically generate an encryption key.

A further object of the present invention is to prevent, when enciphered information is deciphered, a state where there occurs an error such as a defect in the information due to a reading error or a writing error of the information, and the information cannot be correctly deciphered in the entire range or a wide range of a portion connecting with a portion where the error occurs, thereby to keep the range in which the information cannot be deciphered to a minimum.

A copying machine with an encryption function according to the present invention, which optically reads information from a first medium on which information is printed or described or written, and prints or describes or writes the read information on the surface of a second medium, or stores the read information in a third medium in which information is electrically, magnetically or optically stored, or which reads information from a fourth medium in which information is electrically, magnetically or optically stored and prints or describes or writes the read information on the surface of a fifth medium: comprising information reading means for reading the information from the first or fourth medium; encryption key generating means capable of generating an encryption key for enciphering the information read by the information reading means every time encryption processing is performed; enciphering means for enciphering the information read by the information reading means using the encryption key generated by the encryption key generating means; and information writing means for printing or describing or writing the information enciphered by the enciphering means on the second or fifth medium, or storing the enciphered information in the third medium.

The first, second and fifth media are ones on which information is described or printed or written by a pen or a printer, for example, paper, tracing paper, OHP (Over-Head Projector) sheet or the like. Examples of the first, second and fifth media include one having a curved surface in addition to planar one. Examples of the third and fourth media include a semiconductor storage device, a magnetic storage device and an optical storage device.

Examples of the information include a character, a figure and a sign and the like.

Reading of information includes reference of information stored in a semiconductor storage device, a magnetic storage device, an optical storage device or the like in addition to optical reading of information described or written or printed on a medium such as paper. Writing of information includes storage in a semiconductor storage device, a magnetic storage device, an optical storage device or the like in addition to description or printing on paper or the like.

The information written in the first or fourth medium is read by the information reading means, and is enciphered by the enciphering means. The enciphering means performs encryption processing using the encryption key generated by the encryption key generating means. It is also possible for the encryption key generating means to or not to generate the encryption key every time encryption processing is performed. If the encryption key is not generated when encryption processing is performed, an encryption key generated in the past is used. The enciphered information is written into the second, third or fifth medium.

According to the present invention, the enciphered information is written into the medium such as paper, whereby a third person cannot understand the meaning and the content of the information even if he or she sees the paper or the like. Consequently, it is possible to prevent the information from leaking out without storing the medium such as paper in a particular storage location or the like. Decryption processing cannot be performed if the third person does not know the encryption key (a decryption key). Moreover, the encryption key (the decryption key) can be also generated for each copying. Accordingly, the third person cannot easily know the encryption key, thereby to make it difficult to make cryptanalysis of ciphertext. In addition, the encryption key is automatically generated, whereby a user is released from trouble in determining the encryption key.

Preferably, the above described encryption key is generated by enciphering a pseudo-random number. Consequently, the encryption key generated for each copying becomes random, thereby to make it difficult for the third person to know or presume the encryption key.

In accordance with another preferred mode, the encryption key is generated by enciphering data obtained by numerically expressing a time interval between two instructing inputs out of a plurality of instructing inputs provided to the copying machine with an encryption function and including the start and the stop of copying, the number of copies, and the designation of encryption and decryption. The time interval between the two instructing inputs is not fixed because it depends on the input by the user. Consequently, the encryption key generated becomes random, thereby to make it difficult for the third person to know or presume the encryption key.

In a preferred mode of the present invention, the copying machine with an encryption function comprises a first memory and deciphering means. The encryption key generated by the encryption key generating means is stored in the first memory, and the deciphering means deciphers the information read by the information reading means utilizing as a decryption key the encryption key stored in the first memory.

Examples of the first memory include a semiconductor storage device, a magnetic storage device, an optical storage device and the like, and also include one connected to the exterior of the copying machine in addition to one located inside the copying machine with an encryption function.

Therefore, the enciphered information recorded on the second, third or fifth medium can be deciphered.

In accordance with one mode of the present invention, the copying machine with an encryption function comprises determining means for determining, at random, a storage location, which has not been used, in order to store the encryption key generated by the encryption key generating means in the first memory, first displaying means for displaying the storage location determined by the determining means, and inputting means for inputting the storage location displayed by the first displaying means, the deciphering means reading out the encryption key from the storage location in the first memory, which is inputted by the inputting means, and deciphering the information read by the information reading means utilizing the encryption key as a decryption key.

The storage location in the first memory in which the encryption key is stored is determined at random, and is displayed on the first displaying means. The user inputs the storage location by the inputting means when the enciphered information is deciphered. The deciphering means takes out the decryption key on the basis of the inputted storage location, to perform decryption processing.

The user can manage the encryption key by making a note of the storage location on a memo pad of his or her own by establishing a correspondence with the enciphered information or the second, third or fifth medium in which the enciphered information is written. Even if the encryption key differs for each copying, therefore, the user can manage the encryption key without being mistaken for the other, thereby to make it possible to decipher the enciphered information when required.

In accordance with another mode of the present invention, the copying machine with an encryption key comprises determining means for determining, at random, a storage location, which has not been used, in order to store the encryption key generated by the encryption key generating means in the first memory, and a second memory for storing the storage location determined by the determining means, the deciphering means reading out the encryption key from the storage location in the first memory, which is stored in the second memory, and deciphering the information read by the information reading means utilizing the encryption key as a decryption key.

Examples of the second memory include a portable storage device such as a magnetic card, a memory card or a floppy disk.

The storage location in the first memory for storing the encryption key which is determined at random is stored in the second memory. The deciphering means reads out the storage location of the encryption key (the decryption key) which is stored in the second memory and deciphers. The user has the second memory, thereby to make it possible to prevent the storage location of the encryption key from being known by the third person. In addition, the user manages the second memory in correlation with the enciphered information or the second, third or fifth medium in which the enciphered information is written, thereby to make it possible to easily manage the encryption key (the decryption key).

In accordance with still another mode of the present invention, the copying machine with an encryption function comprises identifier determining means for determining an identifier of the second, third or fifth medium, and a third memory for storing the identifier determined by the identifier determining means and the encryption key generated by the encryption key generating means in correspondence with each other.

Examples of the third memory include a portable storage device such as a magnetic card, a memory card or a floppy disk.

Furthermore, in this mode, the copying machine with an encryption function comprises second displaying means for displaying the identifier stored in the third memory, inputting means for designating the identifier displayed by the second displaying means, and deciphering means for reading out from the third memory the encryption key corresponding to the identifier inputted by the inputting means and deciphering the information read by the information reading means utilizing the encryption key as a decryption key.

The identifier is assigned to the medium in which the enciphered information is written. The identifier and the encryption key are stored in the third memory by establishing a correspondence therebetween. A plurality of identifiers and encryption keys can be stored in the third memory. At the time of decryption, the identifiers are displayed on the second displaying means. The user designates the identifier corresponding to the medium to be deciphered out of the identifiers and inputs the designated identifier. The deciphering means reads out the encryption key (the decryption key) corresponding to the inputted identifier from the third memory, to perform decryption processing.

The encryption key is stored by establishing a correspondence with the identifier of the medium in which the encryption key is used, thereby to make it possible to prevent the decryption key (the encryption key) from being unclear at the time of decryption. In addition, the user manages the third memory, thereby to make it possible to easily manage the encryption key and prevent the encryption key from being known by the third person.

In accordance with another preferred mode of the present invention, the copying machine with an encryption function comprises synchronous code adding means for adding a synchronous code for each predetermined spacing to the information enciphered by the enciphering means. At the time of decryption, the deciphering means deciphers the enciphered information by repeating the start and the completion of decryption processing by detecting the synchronous code.

Even if the enciphered information cannot be correctly deciphered due to an error in the information which occurs when the information is written or read (a defect in the information or extra reading of the information), the decryption is completed once by detecting the succeeding synchronous code, after which the decryption is newly started, thereby to make it possible to correctly decipher the information since the succeeding synchronous code was detected. Specifically, the range in which the information cannot be correctly deciphered due to the error in the information can be limited to a zone between a portion where the error in the information occurs and a synchronous code followed by the error portion, thereby to make it possible to prevent the adverse effect thereof from being exerted on ranges other than the zone.

In accordance with a further preferred mode of the present invention, the second or fifth medium includes at least two parallel synchronous areas for synchronization in the information writing means with predetermined spacing, and the information writing means repeatedly prints or describes the information on an area other than the synchronous areas from the one synchronous area to the other synchronous area adjacent thereto on the surface of the second or fifth medium.

Furthermore, the first medium includes at least two parallel synchronous areas for synchronization in the information reading means with predetermined spacing, the information reading means repeatedly optically reads the information from the one synchronous area to the other synchronous area adjacent thereto on the surface of the first medium, and the deciphering means starts the decryption of the information read from the area other than the synchronous areas in synchronization with the movement of the information reading means from the synchronous areas to the area other than the synchronous areas, while completing the decryption of the information in synchronization with the movement of the information reading means from the area other than the synchronous areas to the synchronous areas, to repeat the start and the completion of the decryption.

At least two parallel synchronous areas are provided on the first, second or fifth medium. It is possible to use, as the synchronous area, an area which can transmit light, an area from which light is reflected, a magnetic area, an area having a structural change such as irregularities on a medium, or the like. The information is repeatedly printed or described or read from the one synchronous area to the other synchronous area adjacent thereto.

When the information is deciphered, the decryption of the information read from the area other than the synchronous areas is started in synchronization with the movement of the information reading means from the synchronous areas to the area other than the synchronous areas, while being completed (terminated) in synchronization with the movement from the area other than the synchronous areas to the synchronous areas. The start and the completion (termination) of the decryption are repeated, thereby to decipher the information in the area other than the synchronous areas on the medium.

Even when the enciphered information cannot be correctly deciphered due to the error in the information which occurs when the information is written or read out, the decryption is completed once in the synchronous area followed by the portion where the error in the information exists. The decryption is started again in an area other than the synchronous areas followed by the synchronous area. Consequently, the range in which the enciphered information cannot be correctly deciphered can be limited to only the zone between the portion where the error in the information exists and the synchronous area followed by the error portion, thereby to make it possible to prevent the effect thereof from being exerted on ranges other than the zone.

BRIEF DESCRIPTION OF THE DRAWINGS

FIG. 5 is a block diagram showing the construction of a copying machine with an encryption function comprising an external storage device;

FIG. 6 is a block diagram showing the construction of a copying machine with an encryption function having data compressing and expanding function;

FIG. 10 is a block diagram showing the construction of a copying machine with an encryption function in a third embodiment;

FIG. 11c is an enlarged cross sectional view taken along a line XI—XI shown in FIG. 11a;

FIG. 16 is a block diagram showing the construction of a copying machine with an encryption function in a fourth embodiment.

BEST MODE FOR CARRYING OUT THE INVENTION

Figure 1:
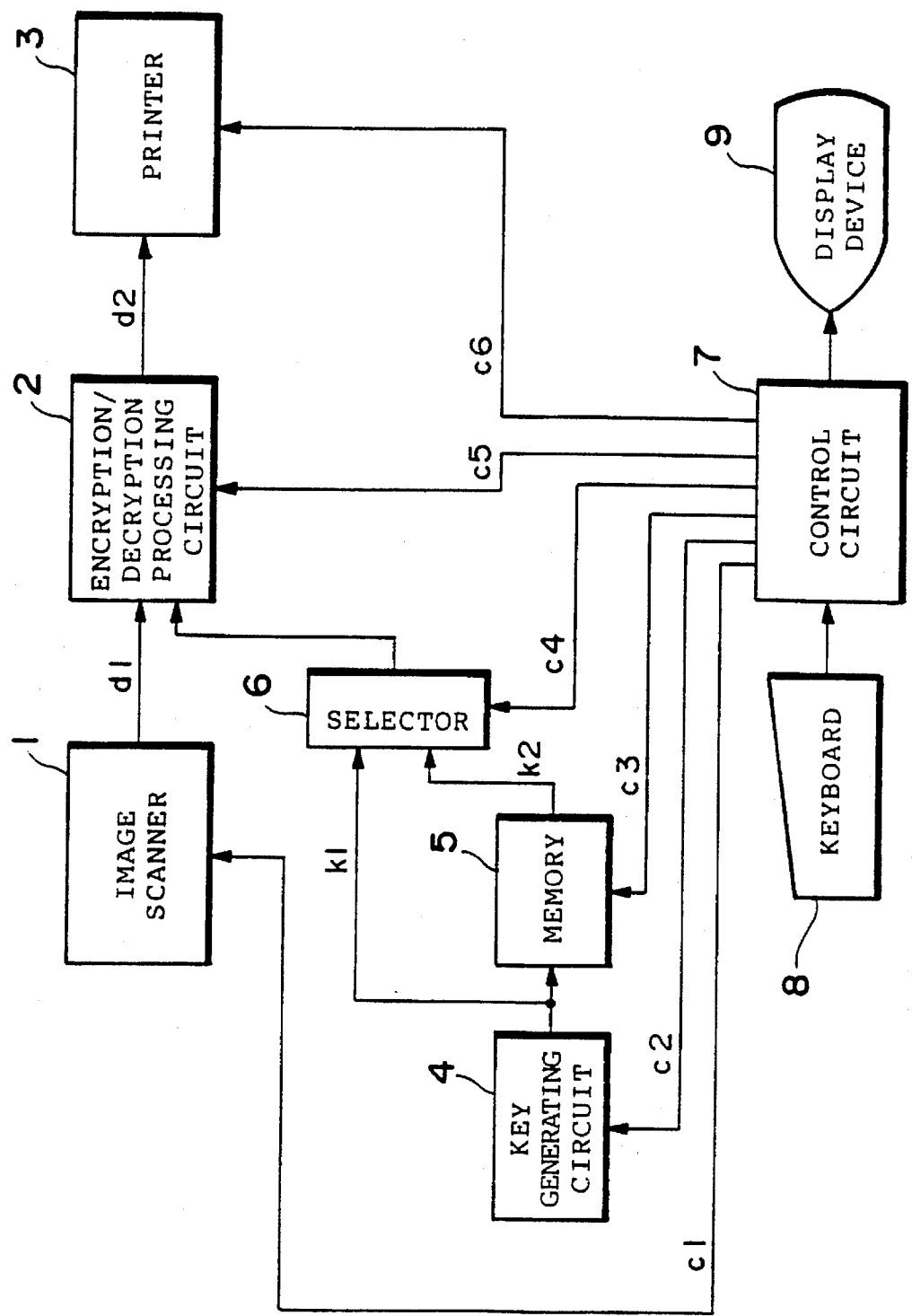
FIG. 1 is a block diagram showing the construction of a copying machine with an encryption function in a first embodiment.

I. First Embodiment (1) Construction of a copying machine with an encryption function FIG. 1 is a block diagram showing the construction of a copying machine (a copier) with an encryption function in a first embodiment.

The copying machine with an encryption function comprises an image scanner 1, an encryption/decryption processing circuit 2, a printer 3 (a laser printer or the like), a key generating circuit 4, a memory 5 (a RAM or the like), a selector 6, a control circuit 7, a keyboard 8, and a display device 9 (a CRT (Cathode Ray Tube) display, a liquid crystal display or the like).

The image scanner 1 optically reads information such as a character or a figure recorded on a medium (a document) such as set paper (photographic paper, OHP paper, tracing paper or the like in addition to plain paper), and converts the information into bit data (image data). Instructions to start and terminate, for example, reading of information are given by a control signal cl from the control circuit 7. The information described on the medium such as paper includes plaintext or ciphertext.

If the read information is converted without including luminance information, one dot determined by the resolution of the image scanner 1 is converted into 1-bit data. The value of bit data corresponding to the one dot is made 1 if the one dot includes information such as a character or a figure (if the brightness of the one dot is less than a predetermined threshold value, that is, it is dark), while being made 0 if there is no information such as character or figure (if the brightness is not less than a predetermined threshold value, that is, it is light). If the read information is converted by including luminance information, the one dot is converted into data composed of a plurality of bits such as four bits or eight bits. Bit data d1 obtained by the conversion is inputted to the encryption/decryption processing circuit 2.

The encryption/decryption processing circuit 2 outputs data d2 to the printer 3 after subjecting the bit data d1 inputted from the image scanner 1 to encryption or decryption processing or without subjecting the bit data d1 to the processing.

When a user designates encryption using the keyboard 8, an instruction to perform encryption processing is given to the encryption/decryption processing circuit 2 by a control signal c5 from the control circuit 7. The encryption/decryption processing circuit 2 subjects the data d1 (plaintext data) inputted from the image scanner 1 to encryption processing, to convert the data d1 into ciphertext data d2. When the user designates decryption, an instruction to perform decryption processing is given to the encryption/decryption processing circuit 2 by the control signal c5 from the control circuit 7. The encryption/decryption processing circuit 2 subjects the input data d1 (ciphertext data) from the image scanner 1 to decryption processing, to convert the input data d1 into plaintext data d2 when the user designates neither encryption nor decryption, an instruction not to perform processing is given to the encryption/decryption processing circuit 2 by the control signal c5 from the control circuit 7, to directly output the input data d1 (plaintext data or ciphertext data) to the printer 3. This is the function of a normal copying machine.

Figures 2A, 2B:
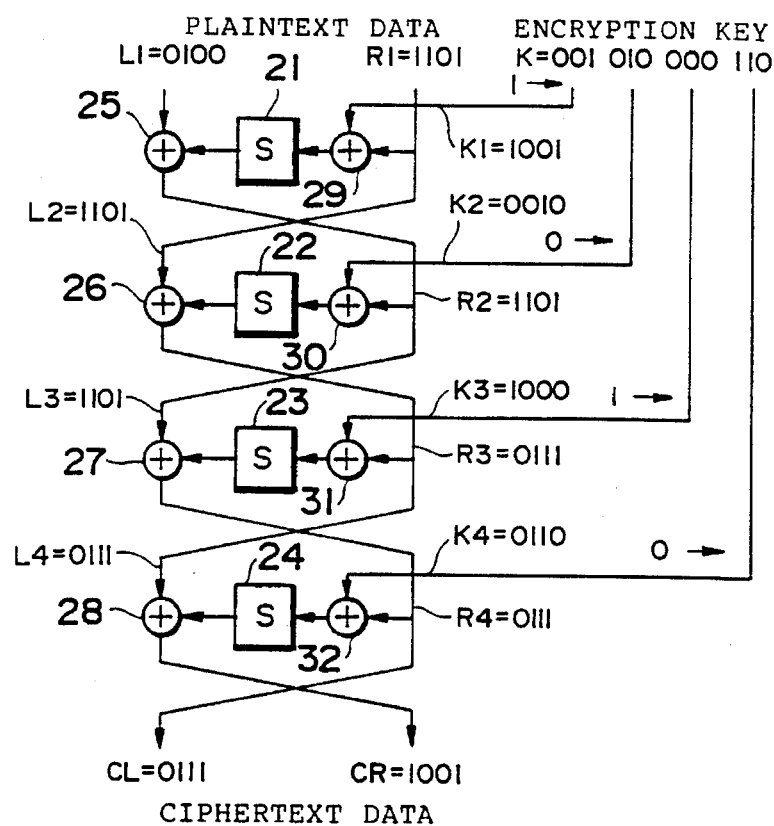
FIG. 2a is a diagram showing the flow of signals in one example of encryption processing for converting plaintext data into ciphertext data.
FIG. 2b illustrates a substitution correspondence table of an S box.

FIG. 2a is a diagram showing the flow of signals in one example of encryption processing of the encryption/decryption processing circuit 2.

8-bit data M (=01001101) and 12-bit data (= 001010000110) are respectively inputted as plaintext data to be enciphered and an encryption key. The plaintext data is applied from the image scanner 1 as described above. The encryption key is applied from the key generating circuit 4 as described later.

S boxes 21 to 24 substitute (convert) input data for (into) output data. For example, if the value of the input data is 1 (a decimal number), 14 (a decimal number) is outputted as the output data. FIG. 2b illustrates a substitution correspondence table of each of the S boxes 21 to 24.

The 8-bit plaintext data is divided into data composed of upper four bits (the left half) L1 (=0100) and data composed of lower four bits (the right half) R1 (=1101). The left half data L1 is inputted to an exclusive OR element 25, and the right half data R1 is inputted to exclusive OR elements 29 and 26.

The 12-bit encryption key K is divided into four data each composed of three bits. Data 1 of 1-bit is added as the most significant bit to three bits (=001) composing the uppermost (leftmost) data and three bits (=000) composing the third data (the third data from the left). Data 0 of 1-bit is added as the most significant bit to three bits (= 010) composing the second data (the second data from the left) and three bits (=110) composing the lowermost (rightmost) data. As a result, the encryption key is changed into data K1 (=1001), K2 (=0010), K3 (=1000) and K4 (=0110) each composed of four bits. The data K1, K2, K3 and K4 are respectively inputted to exclusive OR elements 29, 30, 31 and 32.

The exclusive OR of the data R1 and K1 is found in the exclusive OR element 29, and data representing the result (= 0100) is inputted to the S box 21, and is converted (subjected to substitution) in accordance with the table shown in FIG. 2b. The exclusive OR of data obtained by the conversion in the S box 21 and the data L1 is found in the exclusive OR element 25, and data R2 representing the result (=1101) is inputted to the exclusive OR elements 30 and 27. In the same manner, the exclusive OR of the data R2 and K2 is found in the exclusive OR element 30, data representing the result is converted (subjected to substitution) in the S box 22, and the exclusive OR of data obtained by the conversion in the S box 22 and data L2 (=R1) is found in the exclusive OR element 26, to calculate data R3 (=0111). In the same manner, data is converted (subjected to substitution) in the S boxes 23 and 24, and the exclusive OR of data is found in each of the exclusive OR elements 27, 28, 31 and 32, to generate 8-bit ciphertext data 01111001 comprising data composed of upper (leftmost) four bits CL (= 0111) and data composed of lower (rightmost) four bits CR (= 1001).

In decryption processing, ciphertext data is subjected to an operation reverse to the operation in the encryption processing, so that the ciphertext data is returned to the original plaintext data.

As an algorithm used for encryption and decryption, a general DES (Data Encryption Standard) for enciphering or deciphering 64-bit plaintext or ciphertext data using a 56-bit encryption or decryption key may be used. Alternatively, an FEAL (Fast Encryption Algorithm), for example, may be also used. Further, it does not matter which of a symmetric cryptosystem and an asymmetric cryptosystem (of a modulo exponentiation type, a knapsack type or the like) is used as an algorithm and which of a block cipher and a stream cipher (a Vernam cipher, an NFSR (Non-linear Feedback Shift Register) or the like) is used.

The printer 3 is a device for printing the input data d2 from the encryption/decryption processing circuit 2 again on the medium such as paper. The input data includes ciphertext data and plaintext data as described above. Control of the start and the termination of printing, the number of paper sheets on which printing is done, and the like is carried out in accordance with a control signal c6 from the control circuit 7. The printer 3 may also comprise a function and an equipment of sorting, stacking or the like, similarly to the general copying machine.

The key generating circuit 4 generates an encryption key k1 which is used by the encryption/decryption processing circuit 2 for encryption processing (a decryption key at the time of decryption) when it receives a key generation signal c2 from the control circuit 7. The generated encryption key k1 is outputted to the memory 5 and the selector 6.

An encryption key can be also generated for each copying, or an encryption key already stored in the memory 5 can be also reused without generating an encryption key for each copying.

Figure 3A:
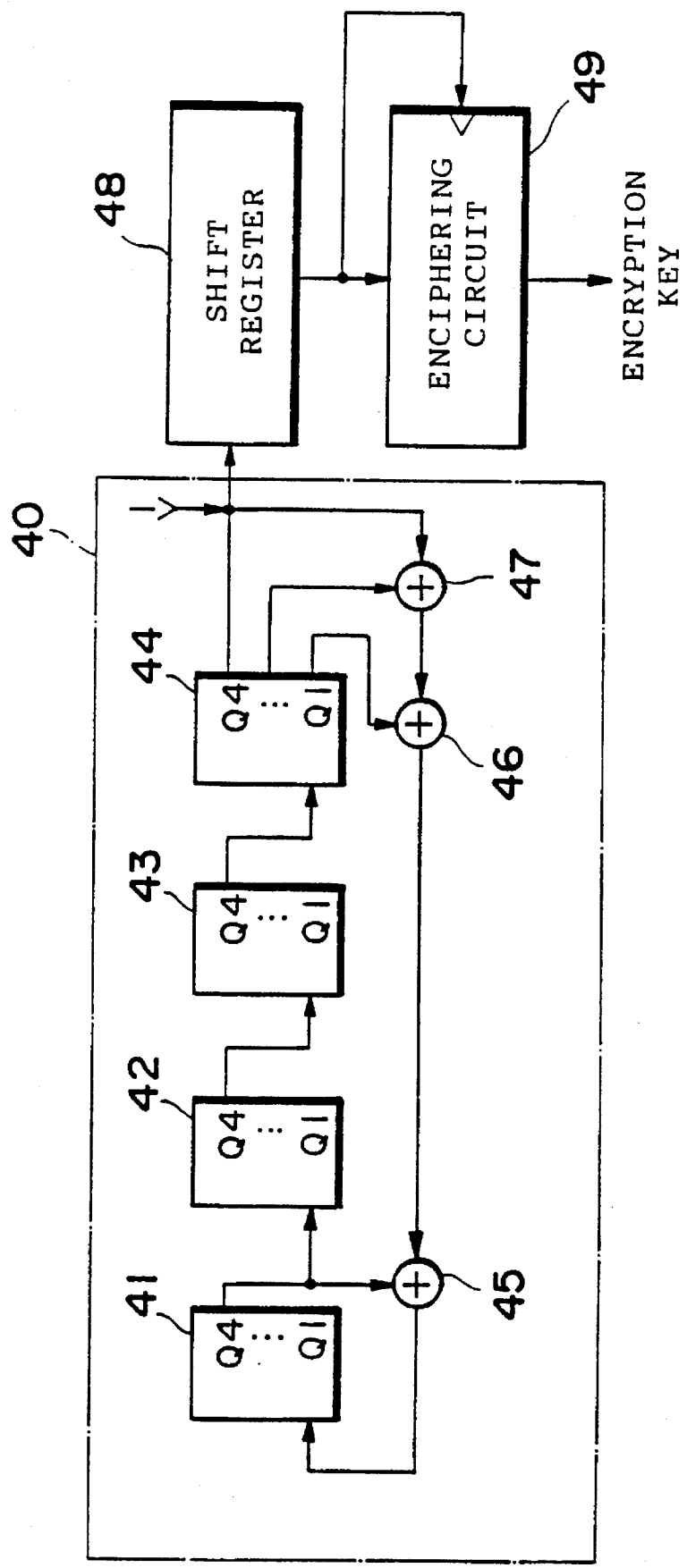
FIG. 3a is a block diagram showing one example of the construction of a key generating circuit.

FIG. 3a is a block diagram showing one example of the construction of the key generating circuit 4. The key generating circuit 4 comprises a pseudo-random number generating circuit 40, a shift register 48, and an enciphering circuit 49. The pseudo-random number generating circuit 40 is constituted by 4-bit counters 41 to 44 and exclusive OR elements 45 to 47. The 4-bit counters are serially connected to each other, thereby to make it possible to generate a pseudo-random number given by a primitive polynomial $F(x)=x^p+x^q+1$ (p and q are integers).

In the pseudo-random number generating circuit 40, an initial value "1" is applied to the exclusive OR element 47 at the time of starting (at the time of turning on the power supply or at the time of reset) in order to prevent all output values of the counters 41 to 44 from being zero at the time of starting. While the copying machine is being operated after the power supply is turned on, a clock signal (not shown) is always supplied to the counters 41 to 44, and 1-bit output data (a pseudo-random number) is supplied to the shift register 48 from an output Q4 of the counter 44.

The shift register 48 is composed of arbitrary bits corresponding to the length of an encryption key. For example, if the encryption key is composed of n bits (n is a positive integer), the shift register 48 is composed of n bits or more bits.

The enciphering circuit 49 enciphers input data to output ciphertext data, similarly to the above described encryption/decryption processing circuit 2. The above described DES or the like can be used as an encryption algorithm. All or a part of data stored in the shift register 48 are inputted as input data (plaintext data). The ciphertext data obtained by enciphering the input data (the output data of the enciphering circuit 49) is applied as an encryption key k1 to the encryption/decryption processing circuit 2.

As an encryption key for enciphering the input data in the enciphering circuit 49, the same data as the input data can be used, or another data can be also used. For example, if the shift register 48 is composed of 12 bits, the 12-bit data can be also used for the input data and the encryption key. If the shift register 48 is composed of 24 bits, the upper 12 bits and the lower 12 bits can be used for the input data and the encryption key, respectively. If the shift register is composed of 18 bits, the upper 12 bits and the lower 12 bits can be also used for the input data and the encryption key, respectively. The bit lengths of the input data and the encryption key can be made different from each other.

Figure 3B:
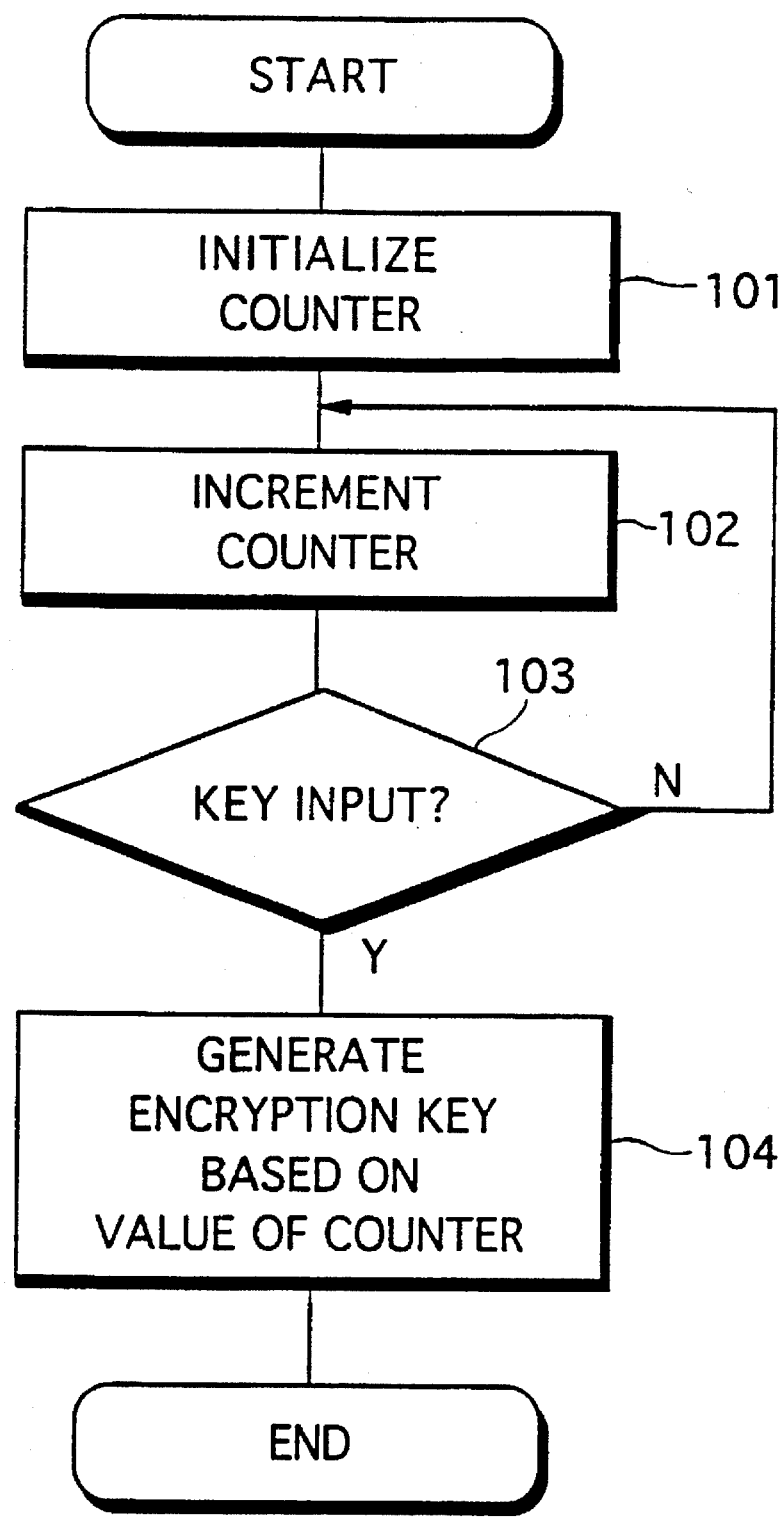
FIG. 3b is a flow chart showing the flow of encryption key generation processing.

FIG. 3b is a flow chart showing the flow of encryption key generation processing in a case where an encryption key is generated by software (a program).

When key input (for example, key input of the set of the number of copies or the designation of encryption) is provided to the keyboard 8 from the user, a counter inside the key generating circuit 4 is initialized to zero by the control signal c2 from the control circuit 7 (step 101). Until the subsequent key input (for example, key input of the start of copying) is provided, the count value of the counter is increased (incremented) one by one (steps 102 and 103).

When the subsequent key input is provided (YES in step 103), the count value of the counter at that time is used as plaintext data (data to be enciphered) and an encryption key, to perform encryption processing (step 104). Ciphertext data obtained by the encryption processing is applied as the encryption key k1 to the encryption/decryption processing circuit 2.

Data obtained by further enciphering a pseudo-random number or the like is thus used as an encryption key, thereby to make it difficult for a third person to know the encryption key (a decryption key).

The memory 5 stores the encryption key generated by the key generating circuit 4. The encryption key stored in the memory 5 is used as a decryption key when the ciphertext data is deciphered. The encryption key stored in the memory 5 can be also used as an encryption key again.

The selector 6 selectively outputs either one of the encryption key k1 generated by the key generating circuit 4 and the encryption key (the decryption key) k2 stored in the memory 5 to the encryption/decryption processing circuit 2 under the control of the control circuit 7. The control circuit 7 controls the selector 6 by a control signal c4 so that the encryption key k1 from the key generating circuit 4 or the encryption key k2 from the memory 5 is fed to the encryption/decryption processing circuit 2 when the encryption/decryption processing circuit 2 performs encryption processing, while the decryption key k2 from the memory 5 is fed to the encryption/decryption processing circuit 2 when the encryption/decryption processing circuit 2 performs decryption processing.

The control circuit 7 controls the image scanner 1, the encryption/decryption processing circuit 2, the printer 3, the key generating circuit 4, the memory 5, and the selector 6, as described above. In addition, the control circuit 7 accepts input data from the keyboard 8, and displays necessary data on the display 9.

The keyboard 8 is a device which is used by the user for inputting the start or the stop of copying, the number of copies, and enlargement, reduction, the set of sorting or stacking, the designation of encryption or decryption, or the like to the copying machine with an encryption function.

The display device 9 is a device for displaying the data inputted from the keyboard 8, necessary guide data to the user, and the like. An address in the memory 5 storing the encryption key may, in some cases, be displayed, as described later.

(2) Copying processing of a copying machine with an encryption function

Figure 4A:
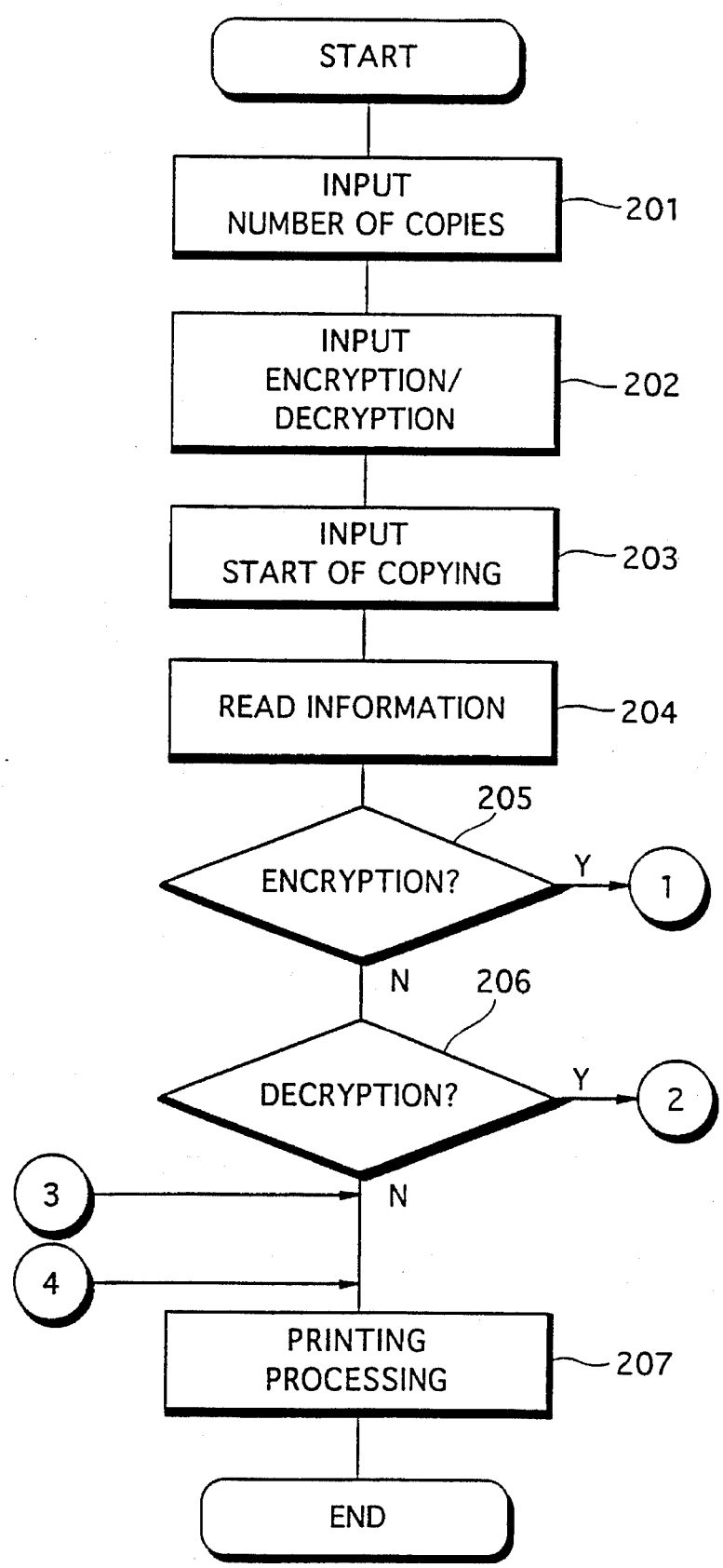
FIGS. 4a, 4b and 4c are flow charts showing the flow of processing of the copying machine with an encryption function in the first embodiment.
Figure 4B:
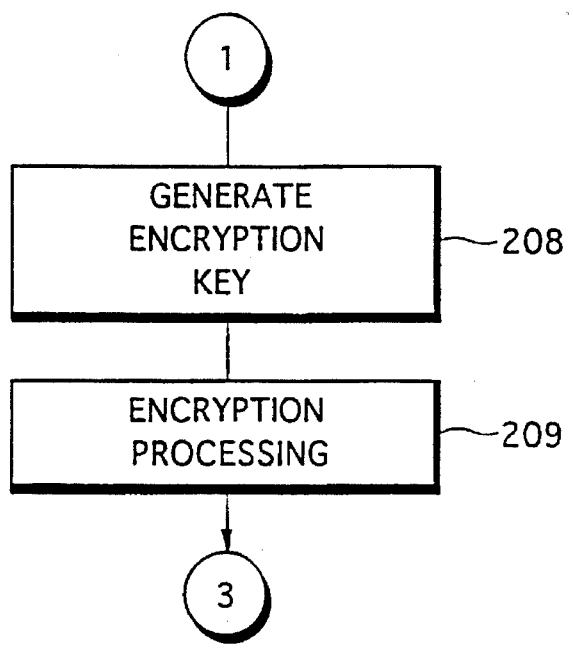
Figure 4C:
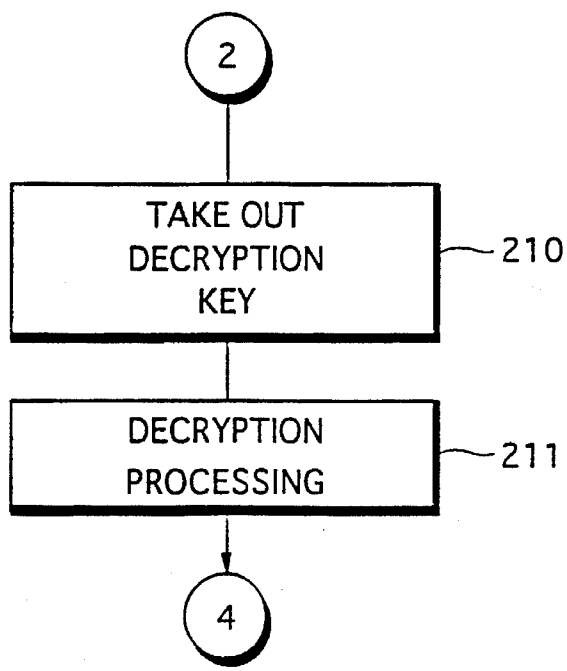

FIGS. 4a, 4b and 4c are flow charts showing the flow of processing of the copying machine with an encryption function in a first embodiment.

The number of copies, the set of sorting or stacking, or the like is inputted through the keyboard 8 by the user (step 201). The inputted data is stored in a memory (a RAM or the like) inside the control circuit 7. The control circuit 7 controls the image scanner 1, the printer 3, and the like on the basis of the inputted data, to make a required number of copies and control sorting or stacking.

An instruction as to which of encryption processing and decryption processing is to be performed is then inputted through the keyboard 8 by the user (step 202). If an "encryption key" and a "decryption key" are provided in the keyboard 8, the designation of encryption or decryption is inputted by these keys. If the decryption processing is performed, the address in the memory 5 storing the decryption key (the encryption key) may, in some cases, be inputted from the keyboard 8, the details of which will be described later. If neither the encryption processing nor the decryption processing is performed, the designation of encryption or decryption and the address are not inputted. The inputted data is also stored in the memory inside the control circuit 7. The control circuit 7 controls the encryption/decryption processing circuit 2, the key generating circuit 4, the memory 5 and the selector 6 on the basis of the inputted data.

An instruction to start copying is then inputted through the keyboard 8 by the user (step 203). The control circuit 7 applies the reading start signal c1 to the image scanner 1 upon this input, and the image scanner 1 reads information described on the medium such as paper (a document) set (step 204).

If the encryption is designated in the step 202 (YES in step 205), the control circuit 7 applies the encryption key generation signal c2 and the enciphering signal c5 to the key generating circuit 4 and the encryption/decryption processing circuit 2, respectively. The key generating circuit 4 generates the encryption key k1 as described above in response to the encryption key generation signal c2 from the control circuit 7 (step 208). The generated encryption key k1 is fed to the encryption/decryption processing circuit 2 through the selector 6, and is stored in the memory 5. The encryption key already stored in the memory 5 can be also fed to the encryption/decryption processing circuit 2 without newly generating an encryption key. The encryption/decryption processing circuit 2 enciphers the input data d1 from the image scanner 1 on the basis of the applied encryption key (step 209).

The printer 3 prints on the medium such as paper the ciphertext data d2 fed from the encryption/decryption processing circuit 2 in accordance with the control signal c6 from the control circuit 7 (step 207).

If the decryption is designated in the step 202 (NO in step 205, and YES in step 206), the control circuit 7 applies the address storing the decryption key and a readout signal to the memory 5 as a control signal c3. Consequently, the decryption key k2 is read out of the memory 5 (step 210), and is fed to the encryption/decryption processing circuit 2 through the selector 6. This decryption key k2 is the same key as the encryption key used when the ciphertext data to be deciphered is enciphered.

Description is made in detail later as to how the encryption key is to be stored in the memory 5, or how the same key as the key used at the time of the encryption is to be taken out, at the time of the decryption.

The control circuit 7 applies the deciphering signal c5 to the encryption/decryption processing circuit 2, and the encryption/decryption processing circuit 2 deciphers the input data d1 from the image scanner 1 on the basis of the applied decryption key (step 211).

If neither encryption nor decryption is designated in the step 202 (NO in step 205, and NO in step 206), the control circuit 7 instructs the encryption/decryption processing circuit 2 to perform neither encryption processing nor decryption processing by the control signal c5, and the encryption/decryption processing circuit 2 outputs the input data d1 from the image scanner 1 to the printer 3 as is.

The printer 3 prints on the medium such as paper the data d2 fed from the encryption/decryption processing circuit 2 in accordance with the control signal c6 from the control circuit 7 (step 207). The processing is terminated.

Thus, a document or a drawing to be copied is printed upon enciphering the content thereof, thereby to make it possible to prevent information from leaking out without storing the printed document or the like in a particular storage location, a book storeroom with a key, or the like. When the document or figure is copied again, decryption processing is performed, thereby to make it possible to know the content of the enciphered document or drawing when required.

The encryption/decryption processing circuit 2 may add an error-correcting code (including a parity code, a CRC (Cyclic Redundancy Check Code) or the like) to the enciphered ciphertext data, and may give to the printer 3 the ciphertext data with the error-correcting code. The printer 3 prints the ciphertext data and the error-correcting code on paper or the like. At the time of decryption, the image scanner 1 reads the ciphertext data and the error-correcting code, and the encryption/decryption processing circuit 2 performs decryption processing after error correction of the ciphertext data is made using the error-correcting code.

Consequently, it is possible to reduce the situation where decryption processing cannot be performed due to an error in the data raised at the time of printing done by the printer 3 (a defect in the data, for example) and an error in the data raised at the time of reading the data by the image scanner 1.

(3) A method of managing an encryption key

When ciphertext is deciphered, the same key as the encryption key used at the time of the encryption must be used as a decryption key. Consequently, the encryption key must be managed in such a manner that the encryption key used at the time of the encryption and paper or the like on which the ciphertext data is printed have a one-to-one correspondence with each other and the encryption key is not known by the third person. The following are examples of the management of the encryption key.

When data is enciphered, the control circuit 7 determines at random an address (a physical address or a logical address) which has not been used in order to store the encryption key in the memory 5. The control circuit 7 stores the encryption key generated by the key generating circuit 4 in a memory cell designated by the above address.

Furthermore, the control circuit 7 displays the address on the display device 9. The user sees the address displayed on the display device 9 to memorize or make a note of, for example, this address in correspondence with the ciphertext or the paper on which the ciphertext is printed. For example, it is considered that an identifier is assigned to the paper or the like on which the ciphertext is printed, to make a note of the address in correspondence with the identifier.

When the ciphertext is deciphered and printed, the user searches an address storing an encryption key (a decryption key) corresponding to the ciphertext in the note or the like, and inputs this address using the keyboard 8. The decryption key (the encryption key) is read out of the memory 5 on the basis of the inputted address, and is applied to the encryption/decryption processing circuit 2, to perform decryption processing.

The user need not know the content of the encryption key, provided that he or she makes a note of or memorizes only the address in correlation with the paper or the like on which the ciphertext is printed.

The user can also eliminate an unnecessary encryption key from the memory 5 using the keyboard 8. Consequently, the memory cell in the memory 5 is released, which can be used for storing another encryption key.

As a modified example, the address in the memory 5 determined by the control circuit 7 as described above is stored in a card (a card with a magnetic stripe, a memory card, or the like) or a floppy disk (FD). In this modified example, a card reader/writer or an FD device (not shown) is connected to the control circuit 7 through an interface circuit. The user sets the card in the card reader/writer or the FD in the FD device. The control circuit 7 writes an address determined in the same manner as described above into the card or the FD. The user describes or writes (makes a note of) on the card or the FD an identifier attached to paper or the like on which ciphertext is printed.

At the time of decryption, the card or the FD is set, whereby the control circuit 7 reads the address recorded on the card or the FD, and a decryption key is read out of the memory 5.

It is possible to store a plurality of addresses in the card or the FD, and also describe or write (make a note of) identifiers assigned to paper or the like which correspond to the respective addresses. In this case, at the time of decryption, data indicating which of the plurality of addresses stored in the card or the like is to be used is inputted to the control circuit 7 by the user.

As another modified example, the control circuit 7 determines an identifier for specifying ciphertext or a medium such as paper on which the ciphertext is printed, and the identifier and an encryption key are stored in a card or an FD in correspondence therewith {with the identifier and the encryption key as a set). A plurality of identifiers and encryption keys respectively corresponding to the identifiers can be stored in one card or one FD.

At the time of decryption, the control circuit 7 reads out the identifiers stored in the card or the FD, and displays a list of the identifiers on the display 9. When the user selects one of the displayed identifiers, an encryption key (a decryption key) corresponding to the selected identifier is read out of the card or the like, to perform decryption processing.

(4) Modified Example

Modified examples of the copying machine with an encryption function include one comprising an external storage device 10 (a floppy disk storage device, a hard disk storage device or the like) and an interface circuit 11 as shown in FIG. 5. An encryption key (a decryption key at the time of decryption) is stored in the external storage device 10. Circuits, devices and the like assigned the same reference numerals as those shown in FIG. 1 are the same as those shown in FIG. 1.

In the copying machine with an encryption function, an encryption key generated by a key generating circuit 4 is fed to an encryption/decryption processing circuit 2 through a selector 6, and is also applied to a control circuit 7. The control circuit 7 stores the encryption key fed from the key generating circuit 4 in the external storage device 10 through the interface circuit 11.

Another modified example is one having a data compressing and expanding function. FIG. 6 is a block diagram showing the construction of a copying machine with an encryption function having a data compressing and expanding function. Compressing/expanding circuits 12 and 13 are respectively provided between an image scanner 1 and an encryption/decryption processing circuit 2 and between the encryption/decryption processing circuit 2 and a printer 3. Circuits, devices and the like assigned the same reference numerals as those shown in FIG. 1 are the same as those shown in FIG. 1.

In this modified example, a user can select two types of processing, that is, processing (1) of compressing data from the image scanner 1 and then enciphering and printing the compressed and enciphered data, and processing (2) of deciphering data from the image scanner 1 and then expanding and printing the deciphered and expanded data. The selected processing is inputted using the keyboard 8.

When the processing (1) is selected, the control circuit 7 respectively applies a compression signal c7 and a non-process signal c8 to the compressing/expanding circuit 12 and the compressing/expanding circuit 13. In response to these signals, the compressing/expanding circuit 12 compresses data d1 from the image scanner 1 and applies compressed data d3 to the encryption/decryption processing circuit 2, and the compressing/expanding circuit 13 applies data d2 as is from the encryption/decryption processing circuit 2 to the printer 3 without processing the data. This makes it possible to compress data on a document set in the image scanner 1 and then encipher and copy the compressed and enciphered data.

When the processing (2) is selected, the control circuit 7 respectively applies a non-processing signal c7 and an expansion signal c8 to the compressing/expanding circuit 12 and the compressing/expanding circuit 13. In response to these signals, the compressing/expanding circuit 12 applies the data d1 as is from the image scanner 1 to the encryption/decryption processing circuit 2 without processing the data, and the compressing/expanding circuit 13 expands the data d2 from the encryption/decryption processing circuit 2 and applies the expanded data to the printer 3. This makes it possible to decipher data on a document set in the image scanner 1 and then expand and copy the deciphered and expanded data.

Data read by the image scanner 1 can be also printed by the printer 3 after being merely compressed or expanded without being enciphered or deciphered.

Furthermore, the data from the image scanner 1 may be compressed by the compressing/expanding circuit 13 to be printed after being enciphered by the encryption/decryption processing circuit 2, or the data from the image scanner 1 may be deciphered by the encryption/decryption processing circuit 2 to be printed after being expanded by the compressing/expanding circuit 12. The data compressing/expanding circuits 12 and 13 may be constructed by one circuit.

An external storage device can be also added as shown in FIG. 5 to the copying machine with an encryption function having a data compressing/expanding function. The image scanner 1, the compressing/expanding circuit 12 or 13 may add an error-correcting code to data.

As another modified example, data (plaintext data or ciphertext data) stored in a magnetic storage device (a floppy disk storage device or a hard disk storage device), an optical storage device, a semiconductor storage device or the like can be inputted to the encryption/decryption processing circuit 2, where the data is enciphered or deciphered, after which the enciphered or deciphered data is printed on paper or the like by the printer 3. It is also possible to encipher or decipher the data from the image scanner 1, and store the enciphered or deciphered data in a magnetic storage device, an optical storage device, a semiconductor storage device or the like.

II. Second Embodiment

Figure 7:
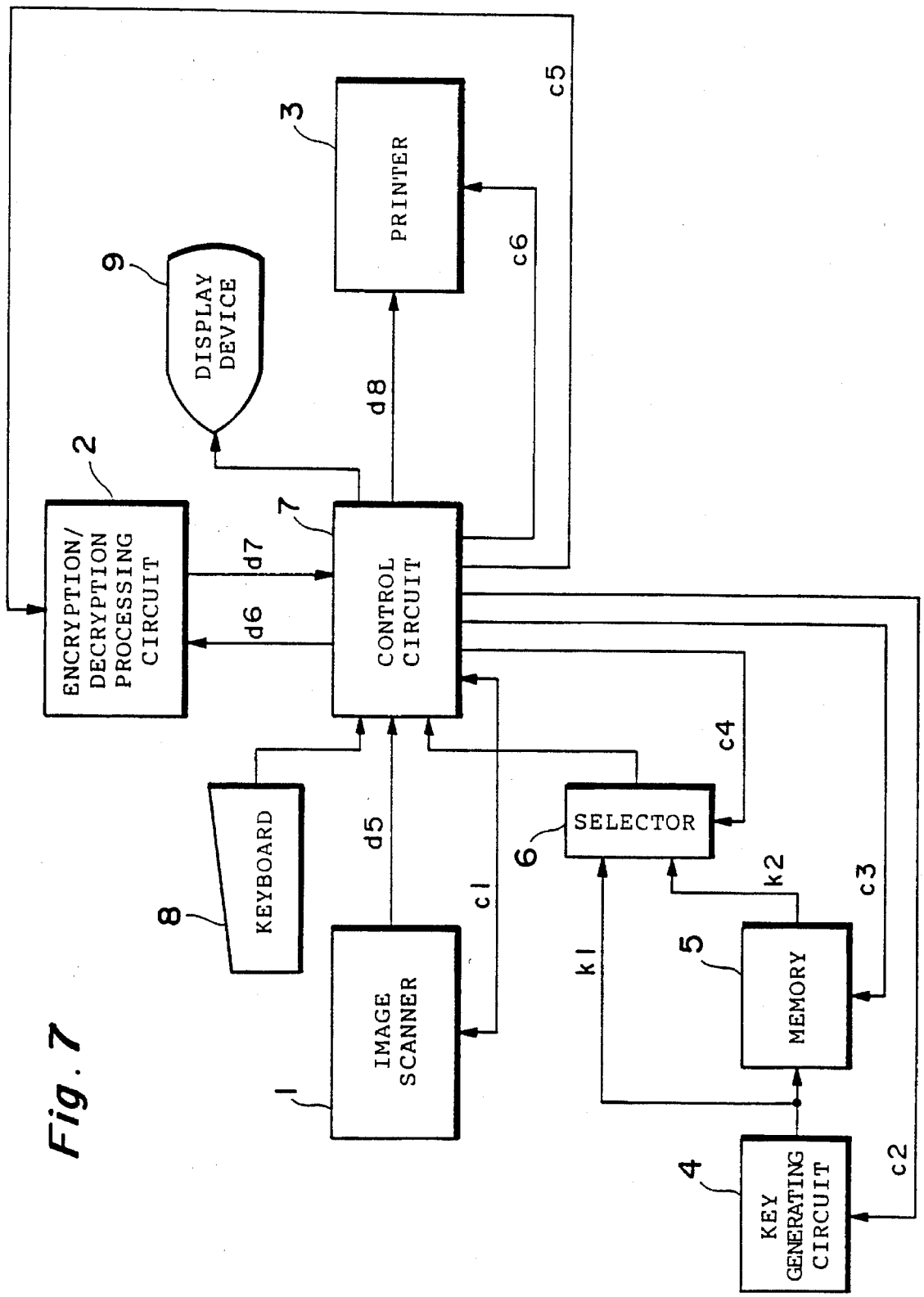
FIG. 7 is a block diagram showing the construction of a copying machine with an encryption function in a second embodiment.

FIG. 7 is a block diagram showing the construction of a copying machine with an encryption function in a second embodiment.

In the copying machine with an encryption function according to the second embodiment, data which is obtained by an image scanner 1 by scanning one line (from one end to the other end of a document such as paper) is enciphered, after which synchronous data is added to the head and the end of ciphertext data of the one line.

Figures 8A, 8B:
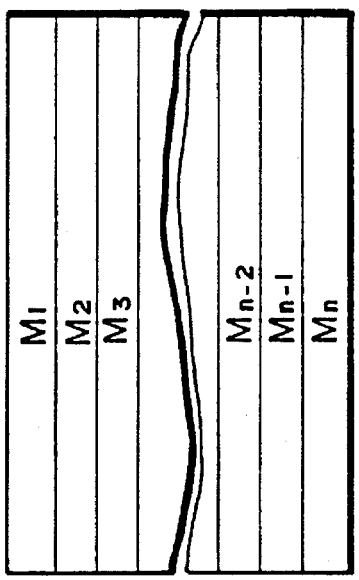
FIG. 8a illustrates for each line ciphertext data obtained by enciphering data from an image scanner.
FIG. 8b illustrates ciphertext data for each line having asynchronous data $j_1$ and $j_2$ respectively added to its head and end.

FIG. 8a illustrates for each line ciphertext data read from the image scanner 1 and enciphered by an encryption/decryption processing circuit 2. Ciphertext data $M_1$ to $M_n$ are respectively ciphertext data obtained by enciphering data which is obtained by the image scanner 1 by scanning one line. FIG. 8b illustrates ciphertext data of each line having synchronous data $j_1$ in its head and synchronous data $j_2$ in its end.

A bit string which is not generally formed when data is enciphered is used for synchronous data. Examples of the synchronous data include 32-bit data FFFFFFFF (in hexadecimal representation) or E5E5E5E5 (in hexadecimal representation). In FIG. 8b, 32-bit data FFFFFFFF (in hexadecimal representation) and 32-bit data E5E5E5E5 (in hexadecimal representation) are respectively used as synchronous data in the head and synchronous data in the end.

Figure 9A:
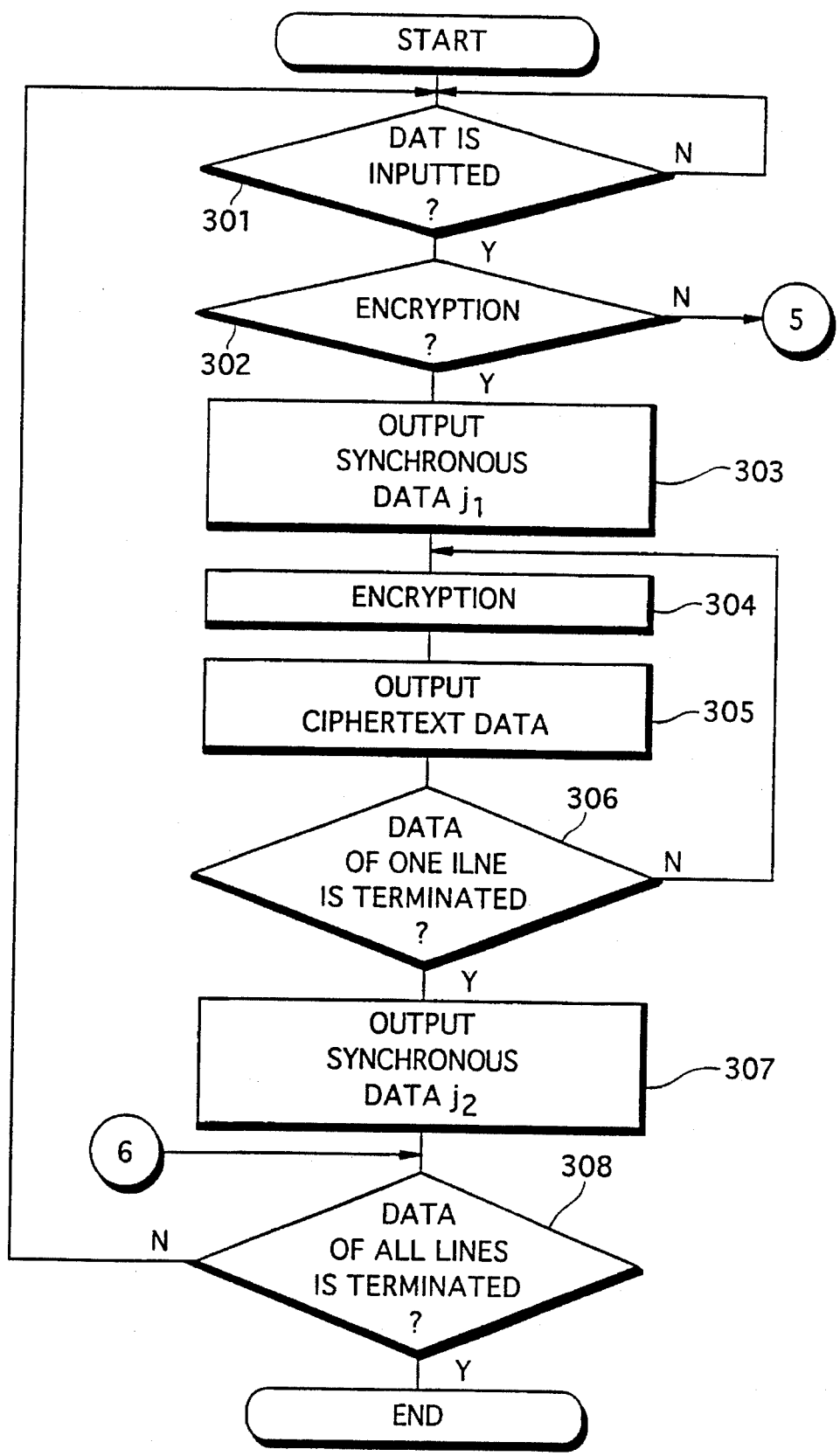
FIGS. 9a and 9b are flow charts showing the flow of processing for adding and eliminating synchronous data.
Figure 9B:
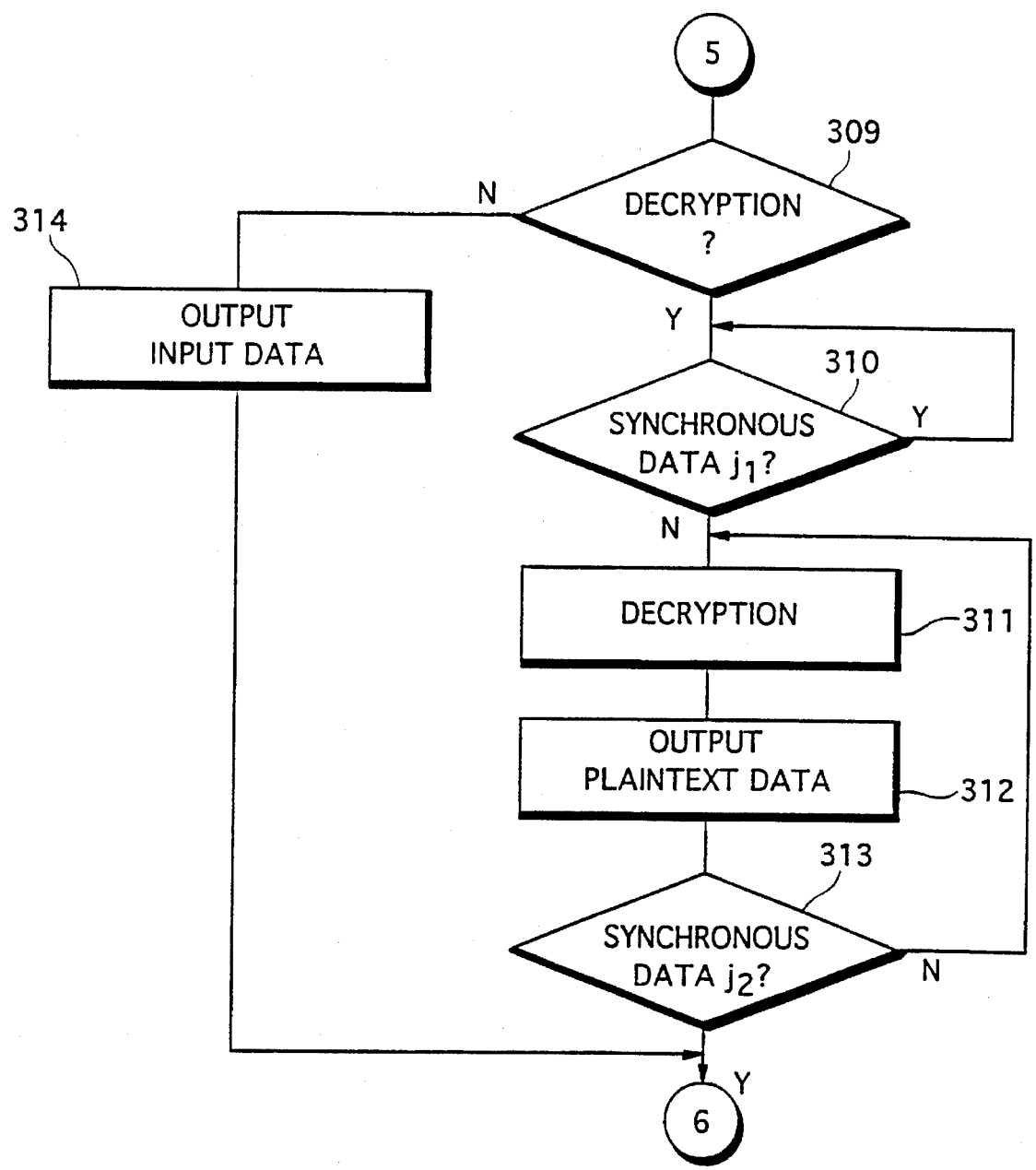

FIGS. 9a and 9b are flow charts showing the flow of processing of adding and eliminating synchronous data.

A control circuit 7 first enters a waiting state of data d5 from the image scanner 1 (step 301). When the data d5 from the image scanner 1 is inputted to the control circuit 7 (YES in step 301), the control circuit 7 judged whether or not data is to be enciphered (step 302).

If data is enciphered (YES in step 302), the control circuit 7 outputs the synchronous data $j_1$ to a printer 3 (step 303), and applies the input data d5 to the encryption/decryption processing circuit 2. The encryption/decryption processing circuit 2 enciphers data d6 fed from the control circuit 7 (step 304), and returns ciphertext data d7 to the control circuit 7. The control circuit 7 outputs the ciphertext data to the printer 3 (step 305).

The control circuit 7 can know whether or not data of one line is terminated on the basis of a control signal c1 applied from the image scanner 1. If the control circuit 7 judges that encryption of data corresponding to one line is terminated (YES in step 306) by the signal c1, the control circuit 7 outputs the synchronous data $j_2$ to the printer 3 (step 307).

When the data is enciphered, the processing in the steps 303 to 307 are performed with respect to data corresponding to all lines (step 308). When the image scanner 1 scans all the lines, the termination of the scanning is informed to the control circuit 7 by the control signal c1, whereby the control circuit 7 terminates the processing (YES in step 308).

In the printer 3, data d8 (ciphertext data and synchronous data $j_1$ and $j_2$) applied from the control circuit 7 is printed on a medium such as paper.

If ciphertext data is deciphered (NO in step 302, and YES in step 309), the control circuit 7 judges whether or not the data d5 from the image scanner 1 is the synchronous data $j_1$, and skips the data d5 if the data d5 is the synchronous data $j_1$ (YES in step 310). After skipping the data $j_1$, the control circuit 7 applies the input data d5 (ciphertext data) to the encryption/decryption processing circuit 2 to perform decryption processing (step 311). The control circuit 7 accepts the deciphered data d7 (plaintext data), and outputs the data d7 to the printer 3 (step 312). If the synchronous data $j_2$ is applied from the image scanner 1 to the controls circuit 7, the decryption processing is terminated (YES in step 313). The same processing is repeated with respect to the succeeding line (step 308). The decryption is started and completed for each data between the synchronous data $j_1$ and $J_2$ (data corresponding to one line).

The plaintext data d8 is applied to the printer 3, where the data is printed on a medium such as paper.

If the data d5 from the image scanner 1 is neither enciphered nor deciphered (NO in step 302, and NO in step 309), the control circuit 7 outputs the input data d5 as is to the printer 3 (step 314).

Devices, circuits and the like assigned the same reference numerals as those shown in FIG. 1 are the same as those shown in FIG. 1.

Even when ciphertext data corresponding to a certain line cannot be correctly deciphered due to defective bits, for example, by adding synchronous data for each ciphertext data corresponding to one line, the effect thereof can be prevented from being exerted on another line. For example, consider a case where ciphertext data corresponding to one line is composed of 1280 bits and is deciphered in units of 64 bits. Further consider a case where 1280 bits composing the ciphertext data corresponding to one line is changed into 1270 bits due to a defect in the data occurring when the data is printed or read (or 1290 bits by extra reading of the data) so that the data cannot be correctly deciphered. Even such a case, the data composed of 1270 bits (or 1290 bits) is not deciphered with 10 bits on the succeeding line added to the 1270 bits (or with extra 10 bits added to the succeeding line), but the 1270 bits data is deciphered as is on this line to complete processing. Decryption is started again in the succeeding line. Consequently, the effect of an error in data corresponding to a certain line is not exerted on the succeeding line.

Modified examples of the second embodiment include one comprising an external storage device, one having a data compressing and expanding function, and one having an error-correcting code added to data, as in the modified example of the first embodiment. In addition, data may be also read from a magnetic storage device or the like in place of the image scanner 1, and data can be also written into a magnetic storage device or the like in place of the printer 3.

III. Third Embodiment

Figure 11A:
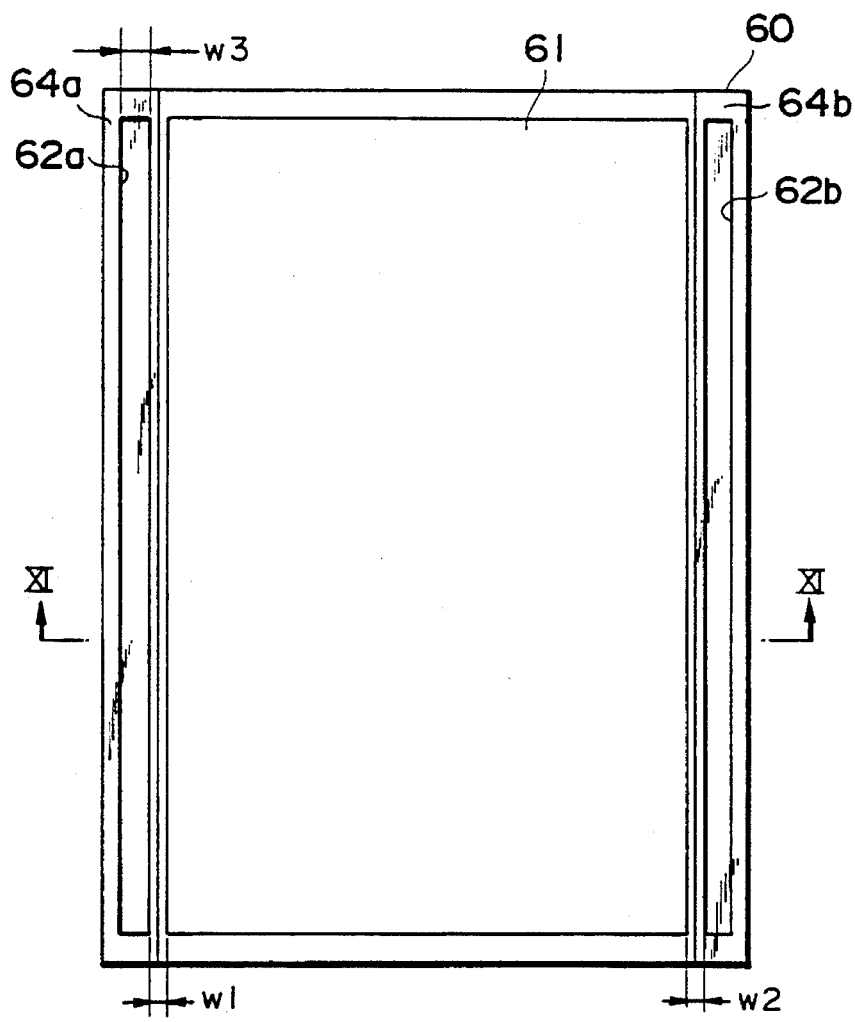
FIG. 11a illustrates the construction of special paper on which ciphertext data is printed in the third embodiment.
Figure 11B:
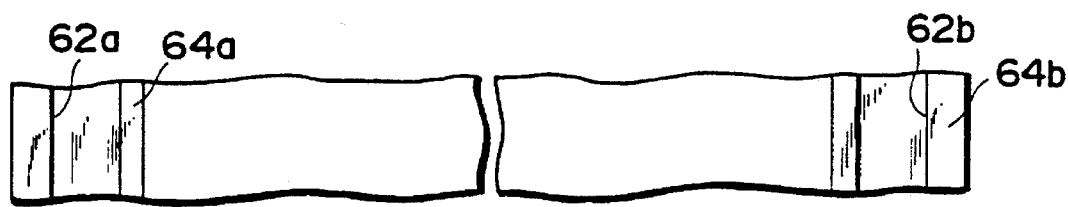
FIG. 11b is an enlarged front view of the special paper.
Figure 11C:
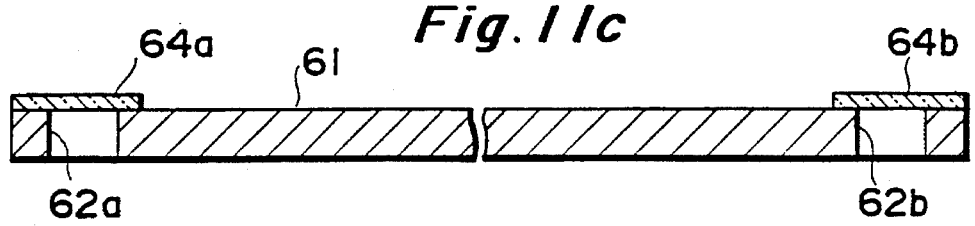

FIG. 11a illustrates the construction of special paper on which ciphertext data is printed in a third embodiment. FIG. 11b is an enlarged front view showing the special paper, and FIG. 11c is an enlarged cross sectional view taken along a line X1—X1 shown in FIG. 11a.

Special paper 60 includes a data area 61 and synchronous areas 62a and 62b. The data area 61 is constituted by plain paper, and ciphertext data is printed on the area 61. The synchronous areas 62a and 62b are in a state where paper is cut, as shown in the enlarged cross sectional view (FIG. 11c). The synchronous areas 62a and 62b are respectively covered with transparent sheets 64a and 64b which can transmit light. Consequently, light can path through the paper from one surface to the other surface thereof in the synchronous areas 62a and 62b.

The width $W_3$ of the synchronous areas 62a and 62b may be a width which a synchronous data detecting circuit as described later can detect. In addition, the respective spaces $w_1$ and $w_2$ between the synchronous area 62a and the data area 61 and the synchronous area 62b and the data area 61 may be set to a predetermined value or zero.

FIG. 10 is a block diagram showing the construction of a copying machine with an encryption function in the third embodiment. Devices, circuits and the like assigned the same reference numerals as those shown in FIG. 1 in the first embodiment are the same as those shown in FIG. 1.

Synchronous data detecting circuits 14 and 16 are circuits for respectively determining whether or not there are the synchronous areas 62a and 62b on paper or the like set on an image scanner 1 and a printer 3.

The image scanner 1 and the synchronous data detecting circuit 14 are operated in synchronization with each other in accordance with by a synchronous signal s1. Specifically, the synchronous data detecting circuit 14 examines whether or not there is a synchronous area with respect to the same portion as a portion where the image scanner 1 reads data. In addition, the printer 3 and the synchronous data detecting circuit 16 are operated in synchronization with each other in accordance with synchronous signal s2. Specifically, the synchronous data detecting circuit 16 examines whether or not there is a synchronous area with respect to the same portion as a portion where the printer 3 prints data.

Figure 12:
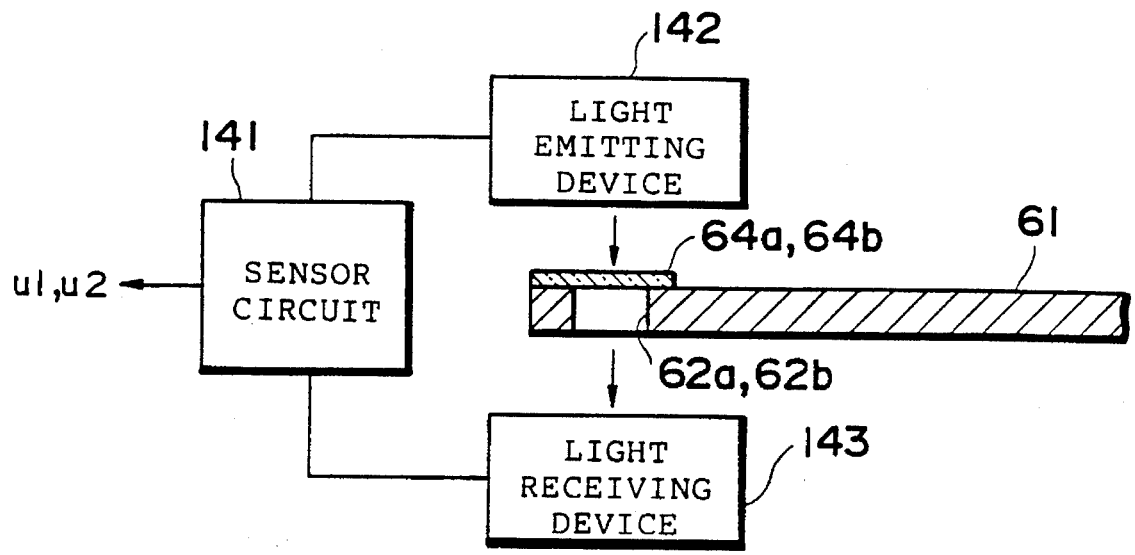
FIG. 12 is a block diagram showing the construction of a synchronous data detecting circuit.

FIG. 12 is a block diagram showing the construction of the synchronous data detecting circuits 14 and 16. Each of the synchronous data detecting circuits 14 and 16 comprises a sensor circuit 141, a light emitting device 142, and a light receiving device 143. If light emitted from the light emitting device 142 passes through a transparent sheet 64a or 64b and a synchronous area 62a or 62b (a notch), and the light receiving device 143 receives the light, an output signal u1 or u2 of the sensor circuit 141 attain a low level (0 which is a binary number). If light from the light emitting device 142 is intercepted by a data area 61 and does not reach the light receiving device 143, the output signal u1 or u2 of the sensor circuit 141 attains a high level (1 which is a binary number). Since plain paper cannot transmit light, an output of the sensor circuit 141 enters a high level state.

Data d1 from the image scanner 1 and the signal u1 from the synchronous data detecting circuit 14 are inputted to a synchronous data removing circuit 15. The synchronous data removing circuit 15 is a circuit for skipping data read from the synchronous areas 62a and 62b if paper set on the image scanner 1 is the special paper and applying only data read from the data area 61 to an encryption/decryption processing circuit 2.

Figure 13:
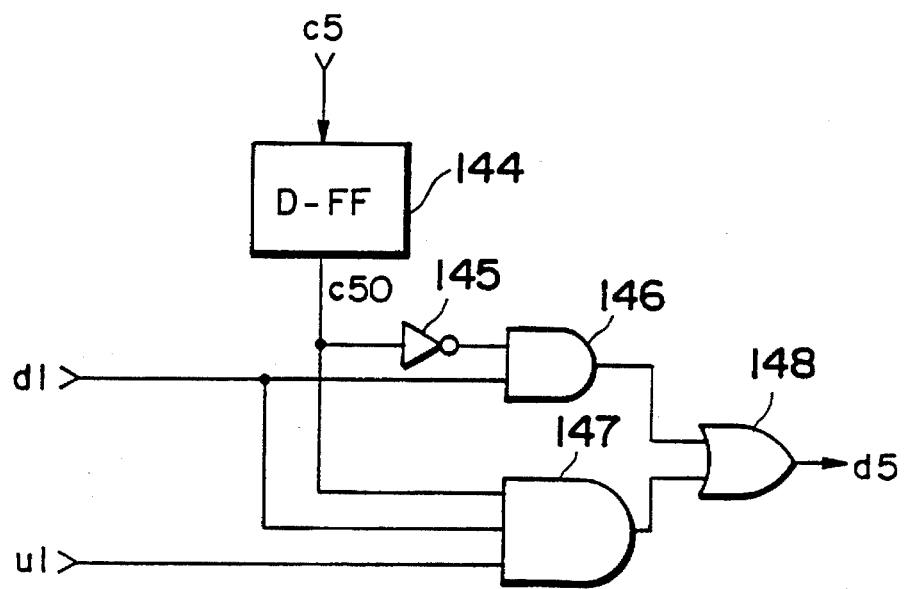
FIG. 13 is a logic circuit diagram showing the construction of a synchronous data removing circuit.

FIG. 13 is a logical circuit diagram showing the construction of the synchronous data removing circuit 15. In a case where ciphertext data is deciphered and printed, a high-level signal is applied as a control signal c5 to a D-FF (D-flip flop) 144 from the control circuit 7, and an output signal c50 of the D-FF 144 attains a high level. In a case where plaintext data is enciphered and printed, a low-level signal is applied to the D-FF 144 from the control circuit 7, and an output signal c50 attains a low level.

Figure 14A:
FIGS. 14a and 14b are timing charts showing the relationship between input data and output data of the synchronous data removing circuit.
Figure 14B:
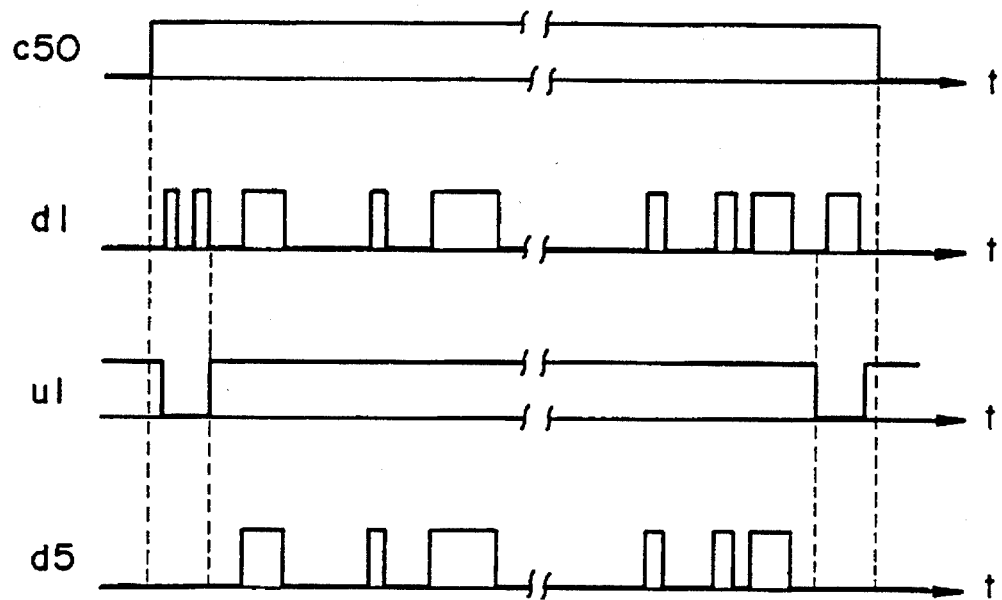

FIGS. 14a and 14b are timing charts showing the relationship among the input data c50 (c5), d1 and u1 and output data d5 of the synchronous data removing circuit 15.

When information described on plain paper or the like is read and enciphered, and the enciphered information is printed on the special paper 60, the signal c50 is brought into a low level by the control circuit 7. Since the plain paper or the like which is not special paper cannot transmit light from the light emitting device 142, the output signal u1 of the synchronous data detecting circuit 14 always attains a high level. The data d1 from the image scanner 1 as is is outputted as the output data d5 of the synchronous data removing circuit 15 (see FIG. 14a).

When ciphertext data printed on the special paper 60 is deciphered and printed, the signal c50 is brought into a high level by the control circuit 7. The output signal u1 of the synchronous data detecting circuit 14 attains a low level in the synchronous areas 62a and 62b of the special paper 60, while attaining a high level in the data area 61 thereof. Consequently, data read from the synchronous areas 62a and 62b by the image scanner 1 is eliminated, and only data read from the data area 61 is applied to the encryption/decryption processing circuit 2 as the output data d5 of the synchronous data removing circuit 15 (FIG. 14b).

The output signal u1 of the synchronous data detecting circuit 14 is also applied to the encryption/decryption processing circuit 2. The encryption/decryption processing circuit 2 starts decryption processing of the input signal d5 in synchronization with the change of the signal u1 into a high level, while completing decryption processing in synchronization with the change of the signal u1 into a low level. Specifically, decryption is newly started and completed repeatedly for each data corresponding to one line read from the image scanner 1.

By thus using special paper having synchronous areas in both its ends, even if data corresponding to a certain line cannot be correctly deciphered because an error such as a defect in the data occurs, as in the above described second embodiment, the decryption is started again in the succeeding line, whereby the adverse effect of the preceding line is not exerted on the succeeding line. In addition, synchronous data need not be added to the ciphertext data by providing the synchronous areas on the paper.

The printer 3 prints input data d2 only when a signal u2 from the synchronous data detecting circuit 16 is at a high level. Consequently, the data can be printed by skipping the data read from the synchronous areas 62a and 62b.

Figure 15A:
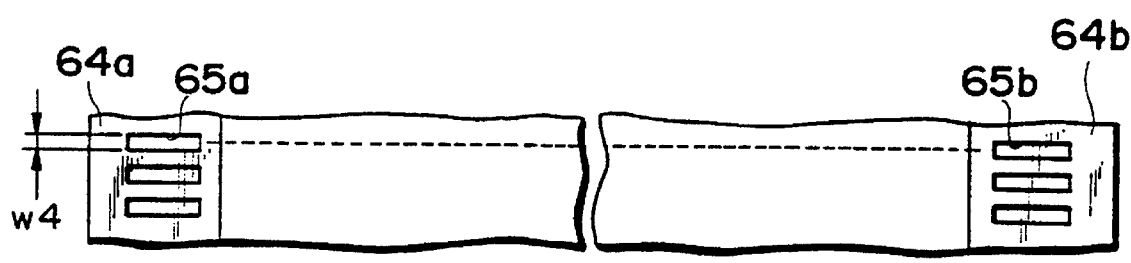
FIGS. 15a and 15c are enlarged front views of special paper.
Figure 15B:
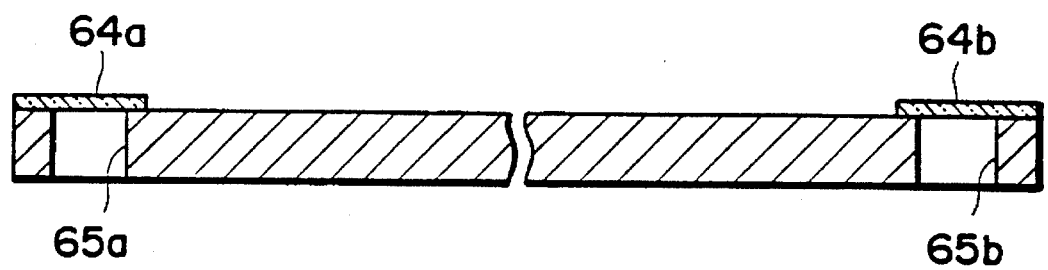
FIG. 15b and 15d are enlarged cross sectional views of the special paper.
Figure 15C:
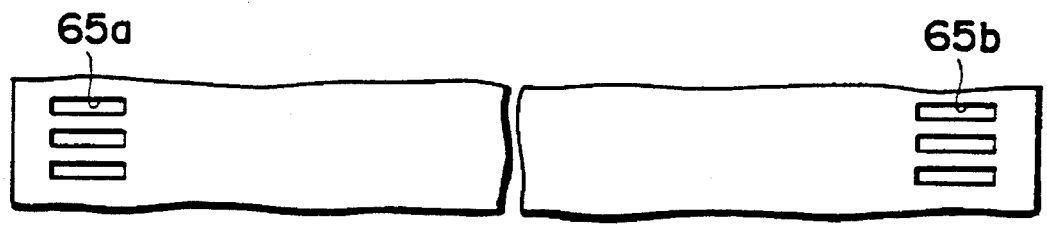
Figure 15D:
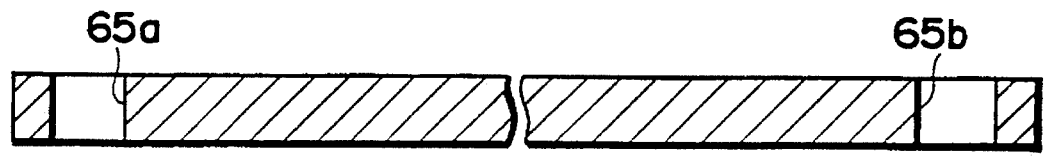

Modified examples of the special paper include ones shown in FIGS. 15a to 15d. FIG. 15a is an enlarged front view, and FIG. 15b is an cross sectional view of FIG. 15a. FIG. 15c is also an enlarged front view, and FIG. 15d is an cross sectional view of FIG. 15c.

Synchronous areas are covered with transparent sheets in FIGS. 15a and 15b, while not being covered with transparent sheets in FIGS. 15c and 15d.

In the modified example, each of the synchronous areas 62a and 62b is constituted by a plurality of slits. The slits can transmit light. Ciphertext data corresponding to one line is printed between slits 65a and 65b (on a broken line). The longitudinal length $w_4$ of the slit may be smaller than one dot determined by the resolution of the image scanner 1.

Furthermore, a synchronous code (for example, E5E5E5E5 in hexadecimal representation) may be printed, for example, in a bar code shape without cutting paper or providing slits in the synchronous areas, or a synchronous code may be printed, for example, in a bar code shape on transparent sheets 64a and 64b. In addition, a magnetic material or a material from which light is reflected can be also used for synchronous areas or created thereto, and the synchronous areas can be detected by detecting its magnetism or reflected light. Further, synchronous areas can have a structural change such as irregularities.

Modified examples of the third embodiment include one comprising an external storage device, one having a data compressing and expanding function, and one having an error-correcting code added to data, as in the modified example of the first embodiment.

IV. Fourth Embodiment

FIG. 16 is a block diagram showing the construction of a copying machine with an encryption function in a fourth embodiment. In the fourth embodiment, a facsimile function is added to the copying machine with an encryption function. A user can utilize the copying machine with an encryption function as a copying machine or a facsimile machine.

Devices, circuits and the like assigned the same reference numerals as those shown in FIG. 6 are the same as those shown in FIG. 6.

When the copying machine with an encryption function is used as a copying machine, data read by an image scanner 1 is processed in the same manner as that shown in FIG. 6 except that it passes through a selector 17 and a demultiplexer 18, and is printed by a printer 3.

When the copying machine with an encryption function functions as a transmitter/receiver in facsimile communication, a receiving circuit 19 and a transmitting circuit 20 are used. The receiving circuit 19 and the transmitting circuit 20 are respectively connected to another transmitter (a facsimile machine) and another receiver (a facsimile machine) through communication lines.

When data from another transmitter is inputted to the receiving circuit 19, control data is inputted to the receiving circuit 19 from another transmitter prior to the data input. The control data includes data representing the presence or absence of compression of received data and data representing the presence or absence of encryption. The control data is applied as a control signal c9 to a control circuit 7 from the receiving circuit 19.

The control circuit 7 to which the control signal c9 is applied gives a control signal c11 to the selector 17 so that data from the receiving circuit 19 is applied to a compressing/expanding circuit 12, gives a control signal c5 to an encryption/decryption processing circuit 2 so as to perform decryption processing if received data is enciphered, and gives a control signal c7 or c8 to a compressing/expanding circuit 12 or 13 so as to perform expanding processing if received data is compressed. Further, the control circuit 7 applies a control signal c12 to the demultiplexer 18 so that data from the compressing/expanding circuit 13 is applied to the printer 3.

If the received data is enciphered after being compressed, therefore, the received data is deciphered by the encryption/decryption processing circuit 2, after which the deciphered data is expanded by the compressing/expanding circuit 13, and the expanded data is printed on paper or the like by the printer 3.

Furthermore, if the received data is only compressed, the received data is expanded by the compressing/expanding circuit 12 or 13, and the expanded data is printed by the printer 3.

When the data read by the image scanner 1 is transmitted to another receiver (a facsimile machine), the control circuit 7 applies the control signal c11 to the selector 17 so that the data from the image scanner 1 is applied to the compressing/expanding circuit 12, and applies the control signal c12 to the demultiplexer 18 so that the data from the compressing/expanding circuit 13 is applied to the transmitting circuit 20.

Furthermore, when the data is enciphered after being compressed and is transmitted, the control circuit 7 respectively applies the compression signal c7 and the enciphering signal c5 to the compressing/expanding circuit 12 and the encryption/decryption processing circuit 2. The control circuit 7 applies data indicating that transmitted data is enciphered after being compressed to the transmitting circuit 20 by a control signal c10. The transmitting circuit 20 transmits the data applied by the control signal c10 as control data prior to the transmission of the data. Thereafter, the transmitting circuit 20 transmits data (ciphertext data) d4 from the demultiplexer 18. Consequently, the data from the image scanner 1 can be enciphered after being compressed and can be transmitted.

The data from the image scanner 1 can be also only compressed by the compressing/expanding circuit 12 or 13 and transmitted, or can be also only enciphered without being compressed and transmitted. In addition, an error-correcting code can be also added to the transmitted data. The compressing/expanding circuits 12 and 13 may be constituted by one circuit.

Modified examples of the fourth embodiment include one comprising an external storage device, similarly to the modified example of the first embodiment.

I claim:

1. A copying machine with an encryption function, which optically reads information from a first medium on which information is printed or described or written, and prints or describes or writes the read information on the surface of a second medium, or stores the read information in a third medium in which information is electrically, magnetically or optically stored, or which reads information from a fourth medium in which information is electrically, magnetically or optically stored and prints or describes or writes the read information on the surface of a fifth medium, comprising:

information reading means for reading the information from said first or fourth medium;

encryption key generating means capable of generating an encryption key for enciphering the information read by said information reading means every time encryption processing is performed;

output command issuing means for issuing a command to output information related to the encryption key generated by said encryption key generating means;

outputting means for outputting the information related to the encryption key generated by said encryption key generating means in response to the output command issued by said output command issuing means; enciphering means for enciphering the information read by said information reading means using the encryption key generated by said encryption key generating means; and information writing means for printing or describing or writing the information enciphered by said enciphering means on said second or fifth medium or storing the enciphered information in said third medium.

2. The copying machine with an encryption function according to claim 1, wherein said encryption key generating means generates the encryption key by enciphering a pseudo-random number.

3. The copying machine with an encryption function according to claim 1, wherein said encryption key generating means generates the encryption key by enciphering data obtained by numerically expressing a time interval between two instructing inputs out of a plurality of instructing inputs provided to the copying machine with an encryption function and including the start and the stop of copying, the number of copies, and the designation of encryption and decryption.

4. The copying machine with an encryption function according to claim 1, further comprising:

a first memory for storing the encryption key generated by said encryption key generating means, and deciphering means for deciphering the information read by said information reading means utilizing as a decryption key the encryption key stored in said first memory.

5. The copying machine with an encryption function according to claim 4, further comprising:

determining means for determining, at random, a storage location, which has not been used, in order to store the encryption key generated by said encryption key generating means in said first memory, first displaying means for displaying the storage location determined by said determining means, and inputting means for inputting the storage location displayed by said first displaying means, said deciphering means reading out the encryption key from the storage location in said first memory, which is inputted by said inputting means, and deciphering the information read by said information reading means utilizing the encryption key as a decryption key.

6. The copying machine with an encryption key according to claim 4, further comprising:

determining means for determining, at random, a storage location, which has not been used, in order to store the encryption key generated by said encryption key generating means in said first memory, and a second memory for storing the storage location determined by said determining means, said deciphering means reading out the encryption key from the storage location in said first memory, which is stored in said second memory, and deciphering the information read by said information reading means utilizing the encryption key as a decryption key.

7. The copying machine with an encryption function according to claim 1, further comprising:

identifier determining means for determining an identifier of said second, third or fifth medium, and a third memory for storing the identifier determined by said identifier determining means and the encryption key generated by said encryption key generating means in correspondence with each other.

8. The copying machine with an encryption function according to claim 7, further comprising:

second displaying means for displaying said identifier stored in said third memory, inputting means for designating said identifier displayed by said second displaying means, and deciphering means for reading out from said third memory the encryption key corresponding to the identifier inputted by said inputting means and deciphering the information read by said information reading means utilizing the encryption key as a decryption key.

9. The copying machine with an encryption function according to claim 1, further comprising synchronous code adding means for adding a synchronous code for each predetermined spacing to the information enciphered by said enciphering means.

10. The copying machine with an encryption function according to claim 4, wherein the information read by said information reading means includes a synchronous code for each predetermined spacing, and said deciphering means deciphers the information by repeating the start and the completion of decryption processing by detecting said synchronous code.

11. The copying machine with an encryption function according to claim 1, wherein said second or fifth medium comprises at least two parallel synchronous areas for synchronization in said information writing means with predetermined spacing, and said information writing means repeatedly prints or describes or writes the information on an area other than the synchronous areas from said one synchronous area to the other synchronous area adjacent thereto on the surface of said second or fifth medium.

12. The copying machine with an encryption function according to claim 4, wherein said second or fifth medium comprises at least two parallel synchronous areas for synchronization in said information reading means with predetermined spacing, said information reading means repeating optically reads the information from said one synchronous area to the other synchronous area adjacent thereto on the surface of said first medium, and said deciphering means starts the decryption of the information read from the area other than the synchronous areas in synchronization with the reading position of said information reading means form the synchronous areas to the area other than the synchronous areas, while completing the decryption of the information in synchronization with the reading position of said information reading means from the area other than the synchronous areas to the synchronous areas, to repeat the start and the completion of the decryption.

13. The copying machine with an encryption function according to claim 1, wherein said output command issuing means is a keyboard or reading means for reading information recorded on a recording medium.

14. The copying machine with an encryption function according to claim 1, wherein said output command issuing means is controlling means for issuing the output command in response to the generation of the encryption key by said encryption key generating means.

15. The copying machine with an encryption function according to claim 1, wherein said outputting means is recording means for recording the information related to the generated encryption key on a recording medium.

16. The copying machine with an encryption function according to claim 15, wherein said recording medium is a memory provided in the copying machine.

17. The copying machine with an encryption function according to claim 15, wherein said recording medium is a portable recording medium.

18. The copying machine with an encryption function according to claim 17, wherein said portable recording medium is a magnetic card, a memory card, or a floppy disk.

19. The copying machine with an encryption function according to claim 1, wherein said outputting means is displaying means for displaying the information related to the encryption key.

20. The copying machine with an encryption function according to claim 1, wherein said outputting means is means for recording the generated encryption key on a recording medium and displaying a recording address.

21. The copying machine with an encryption function according to claim 1, wherein said outputting means is means for recording the generated encryption key in a memory provided in the copying machine and displaying a recording address.

22. The copying machine with an encryption function according to claim 1, further comprising:

synchronous code adding means for adding a synchronous code to the information enciphered by said enciphering means, said synchronous code indicating limits of said enciphered information.

23. The copying machine with an encryption function according to claim 4, wherein the information read by said information reading means includes a synchronous code indicating a head and end of an enciphered portion in said read information, and said deciphering means starts the decryption processing in response to the detection of the synchronous code indicating the head of the enciphered portion, and terminates the decryption processing in response to the detection of the synchronous code indicating the end of the enciphered portion.

24. The copying machine with an encryption function according to claim 1, wherein said second or fifth medium is provided thereon with a synchronous code for synchronization in said information writing means, and said information writing means detects the synchronous code provided on said second or fifth medium, and, in response to the detection of the synchronous code, prints or describes or writes the enciphered information on said second or fifth medium.

25. The copying machine with an encryption function according to claim 1, wherein said first medium is provided thereon with a synchronous code indicating a head position and an end position of a range to be enciphered, said information reading means has means for detecting the synchronous code, and said enciphering means starts the encryption processing in response to the detection of the synchronous code indicating the head position by said detecting means, and terminates the encryption processing in response to the detection of the synchronous code indicating the end position by said detecting means.

26. A cryptographic apparatus comprising:

reading means for reading information and a first code indicating limits to be enciphered from a first medium .which is provided with the information and the first code;

enciphering means for enciphering information, the limits of which are indicated by the first code, of the information read by said reading means using a given encryption key; and writing means for writing or printing on a second medium at least information enciphered by said enciphering means together with a second code indicating limits of the enciphered information.

27. The cryptographic apparatus according to claim 26 further comprising:

deciphering means for deciphering the enciphered information read from said second medium, in accordance with the second code read form said second medium, using a given decryption key.

28. A cryptographic method comprising the steps of:

reading information and a first code indicating limits to be enciphered from a first medium which is provided with the information and the first code;

enciphering information, the limits of which are indicated by the first code, of the information read from said first medium using a given encryption key; and writing or printing on a second medium at least the enciphered information together with a second code indicating limits of the enciphered information.

29. The cryptographic method according to claim 28 further comprising a step of:

deciphering the enciphered information read from said second medium, in accordance with the second code read form said second medium, using a given decryption key.

* * * * *